(12) United States Patent
Joyce et al.

(10) Patent No.: US 7,248,855 B2
(45) Date of Patent: Jul. 24, 2007

(54) CONVERGENT COMMUNICATIONS SYSTEM AND METHOD WITH A RULE SET FOR AUTHORIZING, DEBITING, SETTLING AND RECHARGING A MOBILE COMMERCE ACCOUNT

(75) Inventors: Simon James Joyce, Bangkok (TH); Murali Goparaju, Hyderabad (IN); Sundaram Mohan Kumar, Chennay (IN); Radhakrishnan Subhashree, Hyderabad (IN); Michel Heitstuman, Washington, DC (US)

(73) Assignee: Upaid Systems, Ltd., Paris (FR)

( * ) Notice: Subject to any disclaimer, the term of this patent is extended or adjusted under 35 U.S.C. 154(b) by 247 days.

(21) Appl. No.: 10/096,912

(22) Filed: Mar. 14, 2002

(65) Prior Publication Data
US 2003/0026404 A1 Feb. 6, 2003

Related U.S. Application Data

(63) Continuation-in-part of application No. 09/894,890, filed on Jun. 29, 2001, which is a continuation-in-part of application No. 09/395,868, filed on Sep. 14, 1999, now Pat. No. 6,320,947.

(60) Provisional application No. 60/100,470, filed on Sep. 15, 1998, provisional application No. 60/100,440, filed on Sep. 15, 1998.

(51) Int. Cl.
*H04M 11/00* (2006.01)

(52) U.S. Cl. ............... 455/406; 455/414.2; 455/456.3; 455/414.1; 455/407; 455/408; 705/26; 705/30

(58) Field of Classification Search ........ 455/405–408, 455/414.1–414.4, 456.3, 410; 705/26, 30, 705/72; 379/111–114, 201, 222
See application file for complete search history.

(56) References Cited

U.S. PATENT DOCUMENTS
4,087,630 A 5/1978 Browning et al.
(Continued)

FOREIGN PATENT DOCUMENTS
DE 19938201 A1 2/2001
(Continued)

OTHER PUBLICATIONS
U.S. Appl. No. 10/114,047, filed Apr. 3, 2002, Joyce et al.
(Continued)

*Primary Examiner*—Edan Orgad
(74) *Attorney, Agent, or Firm*—Staas & Halsey LLP

(57) ABSTRACT

A rule set is used to determine at least one rule for authorizing a transaction debiting an account of an authorized user. Subsequently, the account is debited, according to the at least one rule, in real time if the transaction is authorized. The real time debit is settled with transaction providers in accordance with at least one settlement rule. If it is determined that the authorized user does not have sufficient funds in an authorized user account to debit for the transaction, the authorized user account may be recharged by a recharge routine that includes determining a recharge user account to transfer funds from and authorizing the transfer by at least one of referring to a pre-authorized transfer and requesting authorization from the authorized user. The transaction may be requested and the transaction providers may be connected via heterogeneous networks.

64 Claims, 18 Drawing Sheets

U.S. PATENT DOCUMENTS

| | | |
|---|---|---|
| 4,439,636 A | 3/1984 | Newkirk et al. |
| 4,807,275 A | 2/1989 | Enstrom |
| 4,825,130 A | 4/1989 | Enstrom |
| 4,975,942 A | 12/1990 | Zebryk |
| 5,003,584 A | 3/1991 | Benyacar et al. |
| 5,086,457 A | 2/1992 | Barraud et al. |
| 5,148,474 A | 9/1992 | Haralambopoulos et al. |
| 5,206,899 A | 4/1993 | Gupta et al. |
| 5,222,120 A | 6/1993 | McLeod et al. |
| 5,265,033 A | 11/1993 | Vajk et al. |
| 5,276,444 A | 1/1994 | McNair |
| 5,301,223 A | 4/1994 | Amadon et al. |
| 5,317,628 A | 5/1994 | Misholi et al. |
| 5,321,735 A | 6/1994 | Breeden et al. |
| 5,349,636 A | 9/1994 | Irribarren |
| 5,353,335 A | 10/1994 | D'Urso et al. |
| 5,359,642 A | 10/1994 | Castro |
| 5,440,621 A | 8/1995 | Castro |
| 5,511,114 A | 4/1996 | Stimson et al. |
| 5,524,142 A | 6/1996 | Lewis et al. |
| 5,537,464 A | 7/1996 | Lewis et al. |
| 5,557,516 A | 9/1996 | Hogan |
| 5,557,539 A | 9/1996 | Fitch |
| 5,572,005 A | 11/1996 | Hamilton et al. |
| 5,577,100 A | 11/1996 | McGregor et al. |
| 5,577,109 A | 11/1996 | Stimson et al. |
| 5,586,173 A | 12/1996 | Misholi et al. |
| 5,586,175 A | 12/1996 | Hogan et al. |
| 5,590,181 A | 12/1996 | Hogan et al. |
| 5,608,778 A | 3/1997 | Partridge, III |
| 5,615,251 A | 3/1997 | Hogan et al. |
| 5,621,787 A | 4/1997 | McKoy et al. |
| 5,633,909 A | 5/1997 | Fitch |
| 5,633,919 A | 5/1997 | Hogan et al. |
| 5,634,084 A | 5/1997 | Malsheen et al. |
| 5,638,430 A | 6/1997 | Hogan et al. |
| 5,661,781 A | 8/1997 | DeJager |
| 5,668,855 A | 9/1997 | Misholi et al. |
| 5,671,280 A | 9/1997 | Rosen |
| 5,677,955 A | 10/1997 | Doggett et al. |
| 5,692,037 A | 11/1997 | Friend |
| 5,692,132 A | 11/1997 | Hogan |
| 5,699,528 A | 12/1997 | Hogan |
| 5,712,908 A | 1/1998 | Brinkman et al. |
| 5,717,604 A | 2/1998 | Wiggins |
| 5,719,926 A | 2/1998 | Hill |
| 5,721,768 A | 2/1998 | Stimson et al. |
| 5,722,067 A | 2/1998 | Fougnies et al. |
| 5,737,395 A | 4/1998 | Irribarren |
| 5,737,414 A | 4/1998 | Walker et al. |
| 5,745,556 A | 4/1998 | Ronen |
| 5,749,075 A | 5/1998 | Toader et al. |
| 5,778,313 A | 7/1998 | Fougnies |
| 5,784,442 A | 7/1998 | Foti |
| 5,787,403 A | 7/1998 | Randle |
| 5,793,762 A | 8/1998 | Penners et al. |
| 5,825,863 A | 10/1998 | Walker |
| 5,826,185 A | 10/1998 | Wise et al. |
| 5,828,740 A | 10/1998 | Khuc et al. |
| 5,841,966 A | 11/1998 | Irribarren |
| 5,852,812 A | 12/1998 | Reeder |
| 5,854,975 A | 12/1998 | Fougnies et al. |
| 5,864,610 A | 1/1999 | Ronen |
| 5,867,566 A | 2/1999 | Hogan et al. |
| 5,870,473 A | 2/1999 | Boesch et al. |
| 5,878,215 A | 3/1999 | Kling et al. |
| 5,893,076 A | 4/1999 | Hafner et al. |
| 5,897,621 A | 4/1999 | Boesch et al. |
| 5,899,982 A | 5/1999 | Randle |
| 5,909,483 A | 6/1999 | Weare et al. |
| 5,909,486 A | 6/1999 | Walker et al. |
| 5,915,007 A | 6/1999 | Klapka |
| 5,915,093 A | 6/1999 | Berlin et al. |
| 5,915,226 A | 6/1999 | Martineau |
| 5,919,266 A | 7/1999 | Sud et al. |
| 5,920,562 A | 7/1999 | Christie et al. |
| 5,923,734 A | 7/1999 | Taskett |
| 5,930,767 A * | 7/1999 | Reber et al. .................. 705/26 |
| 5,943,320 A | 8/1999 | Weik et al. |
| 5,943,406 A | 8/1999 | Leta et al. |
| 5,956,391 A | 9/1999 | Melen et al. |
| 5,960,069 A | 9/1999 | Felger |
| 5,960,416 A | 9/1999 | Block |
| 5,966,429 A | 10/1999 | Scherer |
| 5,974,146 A | 10/1999 | Randle et al. |
| 5,978,775 A | 11/1999 | Chen |
| 6,006,257 A | 12/1999 | Slezak |
| 6,009,469 A | 12/1999 | Mattaway et al. |
| 6,014,636 A | 1/2000 | Reeder |
| 6,023,499 A | 2/2000 | Mansey et al. |
| 6,036,086 A | 3/2000 | Sizer, II et al. |
| 6,047,267 A | 4/2000 | Owens et al. |
| 6,047,284 A | 4/2000 | Owens et al. |
| 6,058,173 A | 5/2000 | Penfield et al. |
| 6,058,300 A | 5/2000 | Hanson |
| 6,061,664 A | 5/2000 | Pieterse et al. |
| 6,070,067 A | 5/2000 | Nguyen et al. |
| 6,070,185 A | 5/2000 | Anupam et al. |
| 6,081,791 A | 6/2000 | Clark |
| 6,091,944 A | 7/2000 | Friend |
| 6,092,053 A | 7/2000 | Boesch et al. |
| 6,092,055 A | 7/2000 | Owens et al. |
| 6,097,939 A | 8/2000 | Jacobs |
| 6,104,704 A | 8/2000 | Buhler et al. |
| 6,115,458 A | 9/2000 | Taskett |
| 6,115,714 A | 9/2000 | Gallagher et al. |
| 6,119,109 A | 9/2000 | Muratani et al. |
| 6,122,632 A | 9/2000 | Botts et al. |
| 6,137,870 A | 10/2000 | Scherer |
| 6,157,823 A | 12/2000 | Fougnies et al. |
| 6,173,174 B1 | 1/2001 | Jacobs |
| 6,185,198 B1 | 2/2001 | LaDue |
| 6,185,414 B1 | 2/2001 | Brunner et al. |
| 6,188,751 B1 | 2/2001 | Scherer |
| 6,188,752 B1 | 2/2001 | Lesley |
| 6,195,542 B1 | 2/2001 | Griffith |
| 6,205,207 B1 | 3/2001 | Scherer |
| 6,205,433 B1 | 3/2001 | Boesch et al. |
| 6,208,719 B1 | 3/2001 | Lo et al. |
| 6,236,851 B1 | 5/2001 | Fougnies et al. |
| 6,246,755 B1 | 6/2001 | Walker et al. |
| 6,320,947 B1 | 11/2001 | Joyce et al. |
| 6,356,752 B1 * | 3/2002 | Griffith ........................ 455/406 |
| 6,434,378 B1 | 8/2002 | Fougnies |
| 6,434,379 B1 * | 8/2002 | Despres et al. ............. 455/406 |
| 6,453,306 B1 * | 9/2002 | Quelene ....................... 705/80 |
| 6,480,710 B1 | 11/2002 | Laybourn et al. |
| 6,633,630 B1 | 10/2003 | Owens et al. |
| 6,694,300 B1 * | 2/2004 | Walker et al. ................ 705/14 |
| 2003/0119478 A1 | 6/2003 | Nagy et al. |

FOREIGN PATENT DOCUMENTS

| | | |
|---|---|---|
| EP | 0 698 987 | 2/1996 |
| EP | 0921487 A2 | 6/1999 |
| EP | 1107198 A2 | 6/2001 |
| EP | 1107198 A3 | 7/2002 |
| GB | 2 171 877 A | 9/1986 |
| HU | 218405 | 7/1997 |
| HU | 218134 | 10/1998 |
| HU | 220728 | 5/2002 |
| HU | 0220734 | 5/2002 |
| JP | 60-174547 | 9/1985 |
| JP | 61-210754 | 9/1986 |

| | | |
|---|---|---|
| JP | 61-245664 | 10/1986 |
| JP | 02-241171 | 9/1990 |
| JP | 04-257092 | 9/1992 |
| JP | 05-28457 | 10/1993 |
| JP | 5-284257 | 10/1993 |
| JP | 07-15564 | 1/1995 |
| JP | 07-327094 | 12/1995 |
| JP | 09-214640 | 8/1997 |
| JP | 09-245104 | 9/1997 |
| JP | 09-259085 | 10/1997 |
| WO | WO 96/15616 | 5/1996 |
| WO | WO9634483 | 10/1996 |
| WO | WO9714124 | 4/1997 |
| WO | WO 97/22191 | 6/1997 |
| WO | WO 97/33416 | 9/1997 |
| WO | WO9741530 | 11/1997 |
| WO | WO 97/48078 | 12/1997 |
| WO | WO 98/18251 | 4/1998 |
| WO | WO 98/21874 | 5/1998 |
| WO | WO 98/52131 | 11/1998 |
| WO | WO 00/16568 | 3/2000 |
| WO | WO 00/32004 | 6/2000 |
| WO | 00/56085 | 9/2000 |
| WO | WO 00/58948 | 10/2000 |
| WO | WO 01/03090 | 1/2001 |
| WO | 01/11857 A1 | 2/2001 |
| WO | 01/43390 A2 | 6/2001 |
| WO | 01/43390 A3 | 6/2001 |
| WO | 03/010951 | 2/2003 |

OTHER PUBLICATIONS

U.S. Appl. No. 09/851,382, filed May 9, 2001, Joyce, et al., Upaid Systems, Ltd.

U.S. Appl. No. 09/894,890, filed Jun. 29, 2001, Joyce, et al., Upaid Systems, Ltd.

U.S. Appl. No. 09/395,868, filed Sep. 14, 1999, Joyce, et al., Upaid Systems, Ltd.

Search Report for Hungarian Patent Application P0400342 mailed Jun. 22, 2004.

* cited by examiner

| TYPE OF CHARGE | CHARGE DECIDED BY | AMOUNT COLLECTED BY | AMOUNTS DUE TO THE | | BASIS FOR DECIDING CHARGING |
|---|---|---|---|---|---|
| | | | HOME NETWORK (HN) | ROAMING NETWORK (RN) | |
| AIRTIME: | | | | | |
| MOC IN HOME NETWORK | HN | | 100% | | CONSOLIDATED A/T CHARGES TO CUSTOMERS; |
| MTC IN HOME NETWORK | HN | | 100% | | 15% SURCHARGE ASSUMED FOR ABOVE WORKINGS |
| MOC IN VISITING NETWORK | RN | | 13.04% | 86.96% | |
| MTC IN VISITING NETWORK | RN | | 13.04% | 86.96% | |
| PSTN: PUBLIC SWITCHED TELEPHONE NETWORK | | | | | |
| MOC IN HOME NETWORK | HN | | 100% | | SURCHARGE DECIDED BY THE HN |
| MOC IN VISITING NETWORK | RN | | SURCHARGE | ACTUAL | |
| MTC IN VISITING NETWORK | RN | | ACTUAL + SURCHARGE | | |
| SERVICE TAX (5%): | | | | | |
| ON CARDS | GOVT. | HN | 100% | | |
| ON COUPONS IN HPLMN | GOVT. | HN | 100% | | |
| ON COUPONS IN VPLMN | GOVT. | RN | | 100% | |
| RENTALS: | HN | HN | 100% | | |
| RECHARGE FEE: | HN | | 100% | | |

FIG. 10

| Rules for Contract | | | | | |
|---|---|---|---|---|---|
| Merchant | Condition | Value | Unit | Timestamp | Currancy |
| Sify@Info.com | | 90 | Percentage | 0 | |
| Indya@Indya.com | | 50 | Unit | 1 | |
| Satyam Online | After receipt | 5 | Percentage | null | |
| Recliff | | 100 | Amount | 0 | |

| Contract | Valid From | Valid Till | |
|---|---|---|---|
| EpaidProral | 11/23/00 | 11/23/00 | [Rules] |
| ContractParker | 1/22/01 | 1/22/01 | [Rules] |
| TEST | 1/22/01 | 1/22/01 | [Rules] |
| NEWTEST | 11/23/00 | 11/23/00 | [Rules] |
| aaa | 12/12/00 | 12/12/00 | [Rules] |

FIG. 15

| | | | | | |
|---|---|---|---|---|---|
| | Merchant: Sify@Info.com | | | | |
| | Contract: | Contract for Si | | * | |
| | Valid From: | 31 ▼ January ▼ 2000 ▼ * | | | |
| | Valid Till: | 31 ▼ January ▼ 2001 ▼ * | | | |

| Rules | | | |
|---|---|---|---|
| Condition | Payment Mode | Value | TimeStamp |
| - ▼ | Percentage ▼ | 25 | 2 |

| Secondary Merchants | | | | |
|---|---|---|---|---|
| Merchant | Condition | Payment Mode | Value | TimeStamp |
| Indya@Indya.com ▼ | After Receipt ▼ | Amount ▼ | 200 | |
| KotakMahindrains ▼ | - ▼ | Percentage ▼ | 40 | 4 |
| DTDCCourier ▼ | After Receipt ▼ | Unit ▼ | 3 | |

Save | Save & Add More Rules

FIG. 16

CONVERGENT COMMUNICATIONS SYSTEM AND METHOD WITH A RULE SET FOR AUTHORIZING, DEBITING, SETTLING AND RECHARGING A MOBILE COMMERCE ACCOUNT

CROSS-REFERENCE TO RELATED APPLICATIONS

This application is a continuation-in-part of, and claims priority to, U.S. application Ser. No. 09/894,890 filed Jun. 29, 2001 which is a continuation-in-part of U.S. patent application Ser. No. 09/395,868, filed Sep. 14, 1999, now issued as U.S. Pat. No. 6,320,947, which claims the priority of U.S. application Ser. Nos. 60/100,440 and 60/100,470, both filed Sep. 15, 1998, the contents of each being incorporated herein by reference.

BACKGROUND OF THE INVENTION

1. Field of the Invention

The present invention relates to a convergent communications system and method for providing mobile commerce, electronic commerce and communication services using predetermined and real time-determined rules for authorizing, debiting, settling and recharging a user account authorized for paying transactions. More particularly, the present invention relates to a convergent communication system and method using real time-determined and pre-determined rules involving different types of authorized user accounts and different types of service and transaction providers via a heterogeneous network environment.

2. Description of the Related Art

It is known to debit a customer's pre-paid account when telephone charges are incurred. The debits can come from many sources, depending on the account. For example, it is known to establish a pre-paid telephone access account. A customer can then make long distance phone calls or access the phone network.

Further, it is known to establish a post-paid credit account with a bank or other lending institution, and then use that post-paid account to purchase goods and services. Occasionally, a post-paid credit account and roaming telephone services can be combined, such as when a credit card number is exchanged over a wireless telephone link to order services. There are limitations to this system. For example, customers may wish to limit their financial exposure in an account, or may not wish to or for other reasons cannot establish credit with the telephone company. These customers can establish a pre-paid account. However, existing pre-paid account arrangements have at least several limitations.

For example, a pre-paid mobile or wireless phone user may want to use his/her wireless phone while in a territory covered by another phone company. As used hereafter, this is referred to as a visiting or roaming territory or network. While the pre-paid customer may have sufficient credit to complete the phone call using other accounts, such as a credit card, the customer has not established "credit" with the phone company of the roaming territory, or even his original phone company ("home network" or "home territory"), by virtue of being a pre-paid customer. Thus, a pre-paid customer in a roaming territory ("a pre-paid roamer") has no way of having his/her pre-paid home phone company account debited while roaming, unless the roaming network phone company has an agreement with the home network phone company, and has specific hardware at each switch to monitor the call, and debit the customer's pre-paid account. As these agreements are generally impractical to create, there exists no effective pre-paid roaming.

Pre-paid telephony has existed in the telecommunications industry. A customer or user is required to pay a certain amount of money in advance to the communications service provider, and the service provider allows the customer to use the communications services for that pre-paid amount. Once the user account balance reaches zero, the service provider cuts-off the service. The customer then has to recharge his/her account by paying the communications service provider additional funds. The pre-paid account thus needs to be maintained as current. Any transaction that does not have sufficient funds gets handled as a restricted transaction.

When a restricted transaction is encountered, two options exist for handling the transaction. The transaction can be refused. The transaction can be approved, subject to later verification. When a transaction is approved subject to later verification, the account provider accepts the risk of a fraudulent transaction. Thus, if a large debit occurs on a credit account, and the credit account provider approved the transaction subject to a further telephone call to the account holder, when the transaction is found to be fraudulent, usually the credit account provider is held liable.

Various credit account providers will try and apportion these losses based on their position within a marketplace. For example, a credit provider can force vendors that accept their credit cards to accept a portion of the loss of a fraudulent transaction. Alternately, the loss can be reduced by the use of insurance.

In a similar vein, a credit transaction to an account is known. Occasionally, pre-authorized credits, sometimes called overdraft protection, are used. Once again, a simplistic set of restrictions is placed on the account. For example, as long as there are funds in a savings account, a charge that would reduce a checking account balance below zero will be approved, with a subsequent transfer of funds from one account to another.

It is also known to have various discounts for services associated with a specific account. For example, groceries can be purchased at a discount if a customer is part of a savings club. Thus, even though funds are not held in an account, the history of transactions is valuable enough to condition discounts on holding a certain membership. Additional discounts can be conditioned on certain account volumes or an account history. Additionally, advertising and discounts may be specially offered to various customers. It is known to pay for services ahead of time (pre-paid), as well as establishing a credit account for services (post-paid). A post-paid account is established based on the credit worthiness of a customer, and the corporate entity establishing the post-paid account then vouches for the continued credit worthiness of a customer. Post-paid accounts are well known and widely used.

To enable pre-paid communications services, service providers need to control the actual use of funds in the customer pre-paid account in real time (i.e., as the service is being delivered) and service providers need a system that can calculate, in real time, the use of the account funds as the customer call is progressing. There are several systems available in the marketplace for the service providers that simulate such a real time usage control.

In addition, roaming services require data clearing and settlement of financial transactions. Multiparty data clearing and settlements across various network systems can be very complex. Customer account set up and management across networks can be very complex and any delay could result in enormous inconsistencies and confusion for customers. Customers could exhaust their pre-paid account balance while in a visiting network. The customer should be able to add money or "recharge" his/her account from a visiting network. Customer recharge from a visiting network poses several issues including: how to allow for a customer account recharge when the customer is not a customer of the visiting network service provider, how to manage the financial transaction related to payment management and settlement of recharge amounts (e.g., issues related to dealer commissions, the recharge service facilitation process and transfer of money between the home network and visiting network, etc.).

For a post-paid customer, telephone companies are willing to take the customer payment or financial risk as the home network has already evaluated the creditworthiness of the customer and the home network is willing to underwrite that payment risk. However, in case of a pre-paid customer, the home network may not even know whom the customer is, e.g., it could be an anonymous customer. This means that both the visiting network and home network need to have constant agreements for all types of transactions (e.g., communication services as well as commerce transactions).

The telephone company business is complex. Any telephone company service delivery requires various systems to work in tandem to manage customer expectations, e.g., making service available, as well as providing complete and accurate information at the right place at the right time so that the customer is served efficiently. Telephone company systems also need to make sure that internal operations of the telephone company are optimized. That means complete and accurate information needs to be made available at the right time and the right place for the internal staff of the telephone company to use it to effectively manage business. Telephone company systems also need to make sure that they co-exist or are compatible with other third party telephone companies and service providers so that they can collectively offer service to the customers, and manage their business, share revenues, etc. To cater to such large and complex needs of telephone companies/service providers, there is no one single system that can offer the entire functionality. Typically, suppliers, integrators, and telephone companies work together to customize and integrate several different systems to cater to a particular telephone company's needs.

As the pre-paid communication service business was initially anticipated to be a separate service, telephone companies typically have adopted a single company-specific system that can control the calls in real time (or near real time with varied definitions of the phrase "real time"). As the pre-paid communications business has started to grow at a rapid pace worldwide, service providers feel a need to integrate their pre-paid systems with other systems so as to effectively serve their customers and manage business.

However, pre-paid roaming poses several challenges to the telephone company industry. All the participating networks need to have a common understanding of how to manage the call flow, how to offer services, and how to manage business. However, with several systems integrated in several manners across various networks there are quite a few challenges to pre-paid roaming. One fundamental issue is how to achieve a "seamless" service to the customer and effective business management across several participating networks, often heterogeneous or different types of networks. For example, one service provider operator may have an excellent customer care center whereas another operator may not have such a high quality customer care center, or one operator may have a high quality voucher generation/management system while the other operator is managing most of these processes manually. Simple or complex integration of several different systems together does not offer a business solution due to varied permutations and combinations for the telephone companies. Also, it is impractical to expect one or more of the telephone companies to abandon their existing systems and adopt an entirely new system no matter how qualitatively good the new system is.

Known pre-paid systems are single box solutions, which allow for limited integration with external systems. Even in a situation where it is feasible to integrate, it is not possible for other systems to enter into the pre-paid system at various levels. That is, integration to replace some of the functionality of the pre-paid system is not possible. Integration to add additional functionality is what needs to be achieved. This is a major limitation for the telephone companies to effectively manage their business. For example, if a telephone company already has a Personal Identification Number (PIN) generation system, if it would like to deploy a pre-paid system for roaming, it needs to use the PIN generation capability of the new pre-paid roaming system rather than the old system. That means, the telephone company now needs to have two separate PIN generation systems—one for non-roaming subscribers and another for roaming subscribers. This causes a lot of confusion in the marketplace and mere integration with a third party system will not solve the problem. There are other such problems, e.g., distribution management, customer administration, etc.

In addition to the foregoing, when mobile operators enable mobile commerce for a pre-paid roamer in a converged communications and commerce environment, there is a need for financial settlements to various parties involved in the commerce transaction made by the pre-paid roaming customer. Settlement of commerce transactions could additionally involve the following: payments related to commerce transactions may need to be distributed across one or more of the following entities: merchant (provider of goods/service either manufacturer, reseller or distributor or a combination of several such entities), portal (mobile portal or any other type of portal including a voice portal ("Vortal"), e-commerce portal, etc.), Internet service provider (an independent agency or mobile operator itself or portal itself), mobile phone company (home network, visiting network, or both), virtual service provider (either content service provider or infrastructure service provider or a branding agency or any combination), bank/credit card agency or any other financial institution (one or more involved in the transaction), third party payment agency (e.g., a merchant aggregator, payment processing agency, e-wallet, or any such payment processing agency), goods/service delivery agency (e.g., a courier company, bandwidth supplier, and insurance agency). It is also possible that mobile service providers may offer some bundled packages (e.g., if the customer buys $50 worth of goods while roaming, a roaming surcharge on telephony is waived, etc.). This means any settlement system should be capable of arriving at the various settlement amounts based on the tariff plans and roaming agreements between the various parties involved in the commerce transaction.

Various exemplary embodiments of the invention can enable mobile handling devices (phones, PDAs, etc.) to be used for all types of payments especially micro payments. Typically, a customer would use his mobile phone to pay for small value items, such as soft drinks at vending machines, cigarettes, newspapers, books, parking tolls, and other such low value payments which are generally known in the industry as the micro payments.

Existing technologies today allow for such payments to take place in one of the following ways: a customer can use his/her mobile phone and at the time of payment he/she can use his/her credit card or bank's debit card for payment. This means, payment would go thru the banking/credit account of the customer rather than the customer's telephony account. This method has limitations in that it assumes that all customers have either a bank debit card or a credit card. Present growth of pre-paid mobile telephony worldwide indicates that there is a big segment of the market that either does not have any banking/credit relationship or simply does not wish to use their banking/credit relationship for telephony. This is particularly true in certain developing countries with poor banking arrangements. Debit/Credit card assumption also limits the total number of customers who can conduct mobile commerce, and therefore the telephony company may only be playing a very limited role in mobile commerce. Telephone company revenues normally are restricted to the telephony connections and services they have provided. However, a customer could use his/her mobile telephony account for payment of a commercial transaction. That is, the cost of goods/services will be charged to the customer's telephony account. At the end of the month, the customer would get a telephone company bill, which includes the cost of the goods/services purchased. This method has limitations in that it assumes that the customer is a post-paid account customer. That means the system does not accommodate a pre-paid customer and thus cannot conduct a mobile commerce transaction for this type of customer. Instead, the system assumes that the payment risk is carried by the telephone company or by the merchant. At the end of the billing period, if the customer does not pay his/her bill, the telephone company/merchant has to absorb the financial risk.

Customers can have an e-wallet account, which is an account with a Personal Identification Number. Every time, the customer purchases goods, he or she can key in the PIN, and the e-wallet company (e.g., IPIN) can issue a payment guarantee. In this method, e-wallet works as a pre-paid account and only if the money balance is available in the account will a purchase transaction be authorized. This method has limitations because every time a purchase is requested, a user is required to identify him/herself (e.g., using a PIN, which is typically of 12 digits or more). This identification process itself can act as a deterrent and customers may not be interested going through the process for small value purchases. The telephony company again would only be playing a very limited role in the mobile commerce, as its revenues or charges are restricted to the telephony connection it has provided.

To simplify the mobile commerce purchase process, industry is seeking innovative technologies, such as Blue tooth, which allows for direct communication between vending machines and a customer's mobile phone. These technologies, however, also have limitations in that merchants as well as the customer need to be equipped with instruments that are capable of handling these technologies. This means higher set-up costs. Cost economics may not justify the investment at least in the earlier years, and these technologies do not address the issues related to payment risk. These systems assume that all the customers are trust worthy and will honor their payments. In real life, this is not the case. In addition, these technologies do not address the issues related to pre-paid customers. Pre-paid customers could be anonymous, which means neither the telephone company nor the merchant knows who the purchaser is.

In the electronic commerce world today, read/write memory devices are becoming more popular. Read/write memory devices have the capability to store an account balance, and other information related to the customer. Read/write memory devices do not need any network connection to the back-end systems. Read/write memory device readers can be deployed at the merchant's premises and a walk-in customer can use his card to make payments. This mechanism has been found to be useful as it is simple to use both for the merchant and customer, and allows for prepayment.

Every time a service is used, the payment related to that service is deducted from the customer's pre-paid account. It is clear that money in a pre-paid account will reach a zero balance at some point in time. Hence, there is a need by the customer to recharge his/her pre-paid account. There are several commercially available systems in the marketplace that offer pre-paid facilities and most of them offer account recharge. Currently available systems allow for account recharge: by issue of a recharge voucher (the voucher having a unique number, known as PIN, with a certain predetermined value, e.g., $20), which can be used by the customer. The customer dials into an Interactive Voice Response ("IVR") System of the service provider and by way of a guided menu, the customer will be able to recharge his/her pre-paid account by punching in the unique PIN number.

Such a recharge system has limitations in that service providers need to print recharge vouchers and then distribute the vouchers. This is a big logistics and cost problem. Also, there is a potential fraud risk with several types of frauds feasible, for example, leakage of PINs to unauthorized users, unauthorized users randomly trying several numbers and matching the right number, and unauthorized parties printing fake recharge vouchers, like counterfeit currency. Moreover, service providers can offer only predetermined amounts of money per voucher. Although they may offer several types of vouchers, each voucher will have a predefined amount. This means that a customer cannot choose the exact amount of recharge he/she would like to do. Furthermore, such a physical voucher system becomes increasingly difficult logistically the further the user is from his "home base." A service provider in London is unlikely to offer recharge vouchers for sale in Paris, less still in Hong Kong, even though his customers may well travel frequently to these places.

Further, there is the inability of service providers to offer a credit facility to pre-paid customers. Increasing use of pre-paid accounts in the highly developed and credit-driven countries indicate that customers are increasingly using pre-paid accounts for convenience and easy use, rather than any credit related issues. These accounts are known as real time authorized accounts, for credit worthy customers. Such customers do not like to pay upfront payments for services, which they have not yet used. With a credit limit (with assurance of guaranteed payment by third parties like banks, etc.), such a method would increase the number of customers selecting pre-paid accounts and real time authorized accounts.

In situations where a pre-paid amount is programmed onto a card that could be used by a customer (e.g., a SIM card, smart card, magnetic card or any other type of card), the customer can take his card to the nearest outlet where there are special programming machines available for recharging the card. These types of prepayments have been used in the past. However, as mobile commerce becomes increasingly popular, it is anticipated that customers would like to use such solutions for micro payments. Programming the pre-paid amount onto the cards offers convenience to the customer as he or she does not need to punch in a long (often 12 digits or more) code for a very low value transaction.

However, such an account recharge arrangement has limitations in that customers can go to only a limited set of recharge outlets every time they need to recharge. Such cards cannot be recharged at other places. Service providers also do not like to update or recharge very large amounts to these cards due to issues related to fraud (e.g., unauthorized parties with access to equipment that can write large money amounts on the cards), and the inability of service providers to offer a credit facility to pre-paid customers. Furthermore such a recharge system becomes increasingly logistically unworkable the further the user is from his "home base". A service provider in London, say, is unlikely to offer recharge centers in Paris, less still in Hong Kong, even though his customers may well travel frequently to these places. Because, in cases where the service provider is dependent upon the assets of another party, such as a shop premises or distribution infrastructure, he will likely lose a significant percentage of his potential revenue to commission for the use of such assets.

In regular commerce transactions (e.g., using credit cards/ debit cards at a physical store or shop), transaction validation is typically conducted by swiping the card and physical signature verification. Sometimes, as a protection from fraud, credit card/debit card agencies ask the merchant establishment/customer to call the bank. The bank then will use additional security measures like asking a mother's maiden name, date of birth, etc., to assure that the customer is not an unauthorized person. In the Internet and mobile Internet situations today, these additional security measures do not exist and fraud exists as noted above with various of the available no change pre-paid account systems. Due to limited security, fraud on internet/mobile Internet related transactions is estimated to be very high.

SUMMARY OF THE INVENTION

Thus, it is an aspect of the invention to provide a convergent communications system and method of implementing a single user account with the flexibility and sophistication to handle communication services and transactions that originate from many sources. A single account that can handle transactions from multiple service providers and transaction providers will allow for transaction previously unavailable and reduce the cost of other transactions such that they will become more frequent. Various exemplary embodiments of the invention enable Micro-transactions in a multi-vendor, multi-system environment. The various exemplary embodiments create a convenient way to authorize, debit and settle very small transactions. Various exemplary embodiments of the invention provide for a convergent communications system and method that meet the needs of today's mobile, connected user.

It is another aspect of the invention to provide a convergent communications system and method suitable for an increasingly specialized world, where many parties are needed to enable certain transactions. Additional parties may add value to a transaction, and wish to receive compensation based on that value. The real time rule sets described herein allow for the many parties to a transaction to receive payments in accordance with a debiting and payment schedule to which the parties agree. In a complex transaction, each service provider needs to be assured of payment. For these complex collaborative service deliveries the parties in the delivery chain can only get assurance when the complex transaction is authorized in real time, against an account where there are defined rules for authorization which are guaranteed to be applicable at that time (i.e., in real time). Various exemplary embodiments of the invention use real time rule sets to enable multi-party debiting and settlement in such a way that complex transactions between multiple service providers becomes practical.

U.S. patent application Ser. No. 09/395,868 introduced a communications system and method allowing a user to be charged from his or her authorized account with different and multiple carrier services and promotions and tracking of the user's account usage and controls on the user's account usage. In addition, the provisional application defined data structures and systems that enabled various limits and restrictions that may be placed on an account.

The U.S. continuation-in-part, application Ser. No. 09/894,890, introduced a communications system and method employing rules for recharging an account in a convergent communications system and method for electronic commerce as described in U.S. application Ser. No. 09/395,868. Customers could specify accounts to recharge from, amounts to be transferred, conditions for transfers, security involved in the transfers, and many details about recharging an account. Customers could also specify various types of authorizations for mobile and electronic commerce involving an account. Real time debiting and complex settlement were also described.

However, one aspect of the invention described herein is to provide a communication system and method that expand on the adaptability and functionality offered by an account that allows for complex rules related to account recharge, authorization of transactions, real time debiting, and complex settlement and the methods for determining the rules.

A single account that offers flexibility and security for a customer can allow for complex transactions previously unavailable. Various exemplary embodiments of the invention provide a sophisticated rule set to be implemented that allows flexibility and convenience for a customer while providing security for the involved service provider(s). For example, sophisticated rules for crediting an account, authorizing transactions, debiting an account and settling transactions to multiple recipients will provide needed flexibility and convenience in today's and the futures mobile commerce transactions. Thus it is possible to determine whether or not a requested transaction is permissible at any point in time and if not, what incremental actions would make it permissible. Sometimes this will involve presenting choices to the customer but often it will not.

Determining the exact amounts of payment to exact parties can be complex, and needs to be determined at the time of a transaction, to ensure all parties are treated fairly. The exemplary embodiments of the invention provide a transaction to be conducted in real time, with real time authorization and debiting of accounts. The real time rule set can be determined based on various considerations. For example, the time and date of the transaction, the history of the customer and vendors and other factors that can be determined adaptively or progressively based on previous events can be used to support whether to authorize a transaction.

A first category of rules used in the convergent communications system and method is account recharge where a user requests and is required to pay in advance for a mobile commerce, communication or other electronic commerce transaction from various service providers through a convergent communications system and method in a heterogeneous network environment. Account recharge can include any sort of credit coming into an account. Various examples include money, stocks, frequent flyer miles, membership, additional periods for membership, credit allowances, ownership transfers, or any other now known or later devised method for transferring value into an account. Account recharge can be automatic, semi-automatic, manual, or automatic within certain parameters, and manual otherwise. Various exemplary embodiments of the invention provide recharge from any of the following: recharge voucher, direct linkage to the guarantor account (credit/debit/any other type of account), recharge by the customer from the mobile phone, or a fixed phone, directly debiting the guarantor account (credit/debit/any other type of account), recharge by the customer from a bank's ATM, or recharge by cash payment at a cash counter. A user can thereby set up complex but functional scenarios for recharging his or her customer account.

A second category of rules used in the convergent communications system and method is authorization and validation rules where a user requests and is required to pay in advance for a mobile commerce, communication or other electronic commerce transaction from various service providers through a convergent communications system and method in a heterogeneous network environment. Because exemplary embodiments of the invention provide for links to credit services, telephones and the Internet, rules are included outlining under what circumstances money can be taken out of the account. Various examples include per charge limits, second system notifications, account charge limits, membership limits, or any other now known or later devised method for limiting single transactions, monthly transactions, account balance, transaction originator and transaction recipient. A user can thereby set up complex but functional scenarios to control who is authorized to use an account and why.

A third category of rules used in the convergent communications system and method is debiting rules where a user requests and is required to pay in advance for a mobile commerce, communication or other electronic commerce transaction from various service providers through a convergent communications system and method in a heterogeneous network environment. Various exemplary embodiments of the invention provide various service providers to set up various methods for debiting either a service provider or customer's account. For example, a telephone services provider may provide for one payment to its own account, one payment to a roaming network provider's account and a third payment to a long distance provider's account.

Aspects of the invention as described above can be attained by a convergent communications method employing a rule set, having several functions, including determining, for an authorized user, at least one rule applicable at that time for authorizing a transaction and debiting an account of the authorized user, applying the at least one rule for authorizing the transaction, debiting the account, according to the at least one rule for debiting an account, in real time if the transaction is authorized and settling the real time debit to a plurality of transaction providers in accordance with at least one settlement rule.

For the above system and method, various aspects may include determining that the authorized user does not have sufficient value in an authorized user account to debit for the transaction and recharging the authorized user account after completing a recharge routine having several functions including determining a recharge user account to transfer funds from and authorizing the transfer by at least one of referring to a pre-authorized transfer and requesting authorization from the authorized user. Other aspects may include where the recharging is performed utilizing a plurality of recharge user accounts. Other aspects may include where the requesting authorization from the authorized user is at least one of requesting a PIN, requesting manual entry, requesting a user pass phrase and confirming user identity through biometric means.

For the above system and method, various aspects may include where the applying is performed utilizing a plurality of rules for authorizing the transaction, the debiting is performed utilizing a plurality of rules for debiting an account and the settling is performed utilizing a plurality of settlement rules, or where the debiting is performed utilizing a plurality of rules for debiting an account and the settling is performed utilizing a plurality of settlement rules. Other aspects may include where the settlement occurs at least one of immediately, after 3 days, at the end of a calendar month, at regularly spaced intervals and as a series of partial payments and where the applying the at least one rule for authorizing the transaction includes authorizing the transaction using at least one of a user PIN, manual entry, a user pass phrase and confirming user identity through biometric means.

For the above system and method, various aspects may include determining at least one rule, applied in real time at the time of a transaction authorization request according to an algorithm using data relating to historical events, which are considered to have relevance to the transaction authorization request. Other aspects may include where the historical events are an authorized user's previous purchases or actual outcomes of historical risk assessments or where such historical data available is constantly changing. Other aspects may include where the transaction is requested and a connection to the plurality of transaction providers is across heterogeneous networks.

Aspects of the invention as described above also can be attained by a user input device for accessing an account in a convergent communications system, having a transmitter that transmits to the convergent communications system for accessing an authorized user account, requesting a transaction from an account manager, wherein the account manager has a determiner that determines, for an authorized user, at least one rule, applicable at that time for authorizing a transaction and debiting an account, a processor that applies the at least one rule for authorizing the transaction, a debiter that debits the account, according to the at least one rule for debiting an account, in real time if the transaction is authorized and a settler that settles the real time debit to a plurality of transaction providers in accordance with at least one settlement rule and a receiver that receives at least one of a confirmation of accessing the authorized user account, a confirmation from the account manager of authorized user account debiting and a notification of settlement.

Aspects of the invention as described above further can be attained by a convergent communications system employing a rule set, having a determiner that determines, for an authorized user, at least one rule, applicable at that time for authorizing a transaction and debiting an account of the authorized user, a processor that applies the at least one rule for authorizing the transaction, a debiter that debits the account, according to the at least one rule for debiting an account, in real time if the transaction is authorized and a settler that settles the real time debit to a plurality of transaction providers in accordance with at least one settlement rule.

Aspects of the invention as described above further can be attained by a convergent communications system employing a rule set, having a determiner that determines in real time a plurality of rules for authorizing, debiting and settling a transaction at a current time, an authorizer that authorizes the transaction if a current status of an authorized user's account or the authorized user meets the plurality of rules for authorizing the transaction at the current time, a debiter that debits the authorized user's account in real time and credits at least one transaction provider account and a settler that settles the transaction according to the at least one rule for settling the transaction.

BRIEF DESCRIPTION OF THE DRAWINGS

These and other aspects and advantages of the present invention will become more apparent and more readily appreciated from the following description of the preferred embodiments, taken in conjunction with the accompanying drawings of which:

FIG. 10 is an exemplary embodiment of a balance of charges utilizing a convergent communications system;

FIG. 15 is an exemplary screenshot of vendor information for settlement in a convergent communications system;

FIG. 16 is an exemplary screenshot of adding vendor information to a convergent communications system;

DETAILED DESCRIPTION OF THE PREFERRED EMBODIMENTS

Figure 1:
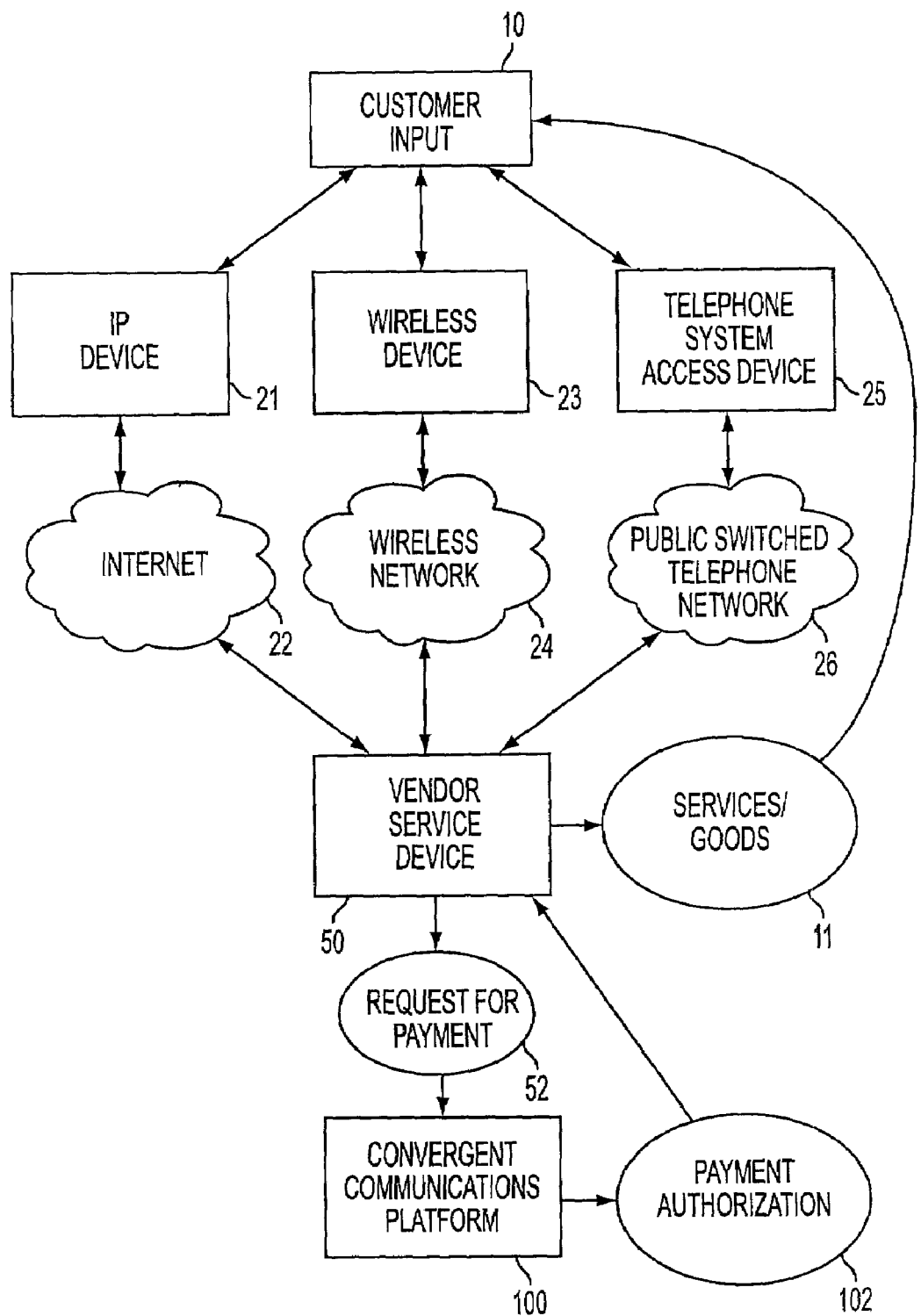
FIG. 1 is an exemplary embodiment of a convergent communications system and method utilizing a mobile commerce server.

As described herein, the exemplary embodiments of the invention are applicable to a system, method and platform for use with heterogeneous networks and for converged (or convergent) communications, converged commerce and converged services. While various industry terms and acronyms are used, several terms have the following additional meanings as described.

Examples of heterogeneous networks are networks having dissimilar or diverse technology components or constituents combined. For example, a heterogeneous network can have: different telecommunication standards, like GSM and CDMA; different versions of the same telecom standard, like GSM 900 and 1900; different switching environments, like Nokia and Ericsson; intelligent network (IN) or non-IN; different signaling, like ISDN and SS7; different operating systems, like UNIX and Microsoft Windows NT; different flavors of the same operating system, like Solaris (Sun) and AIX (IBM); different versions of the same operating system, like 2.0 and 2.1; different server hardware, like IBM and Compaq; same operators, but different network types, like the networks run by the KDDI corporation, the CMDA, corporation and the PDC corporation in Japan, and same operator, but different networks, like the networks run by the Vodafone corporation in different countries.

Examples of convergence are to combine a variety of technologies and media together to provide a richer level of service. For example, converged communications can combine: different media, like voice, data, messaging; mobile, fixed or satellite voice, data, messaging offered by different service providers; mobile, fixed or satellite voice, data, messaging media offered by different service providers; mobile, fixed or satellite voice, data, messaging media offered by same service provider; and mobile, fixed or satellite voice, data, messaging offered by different service providers. Converged commerce includes combining telephone, internet, e-commerce or m-commerce. Converged service includes combining communications and commerce services. Converged billing can include such features as offering a single, integrated bill for all communications services, and charges for content or goods that are delivered. Converged commerce can also refer to integrating all charges for a transaction into one transaction and cost that includes such items as surcharges, taxes, telecommunications fees, etc. Converged service can also refer to offering a single help operator that can access, view and modify a customer's account, even if the account does not reside on a local network.

Real time is the concept of gathering all relevant information at a point in time, and making a determination based on that information. For example, a real time system will compile relevant information, such as the fact that a call is ongoing and make a determination as quickly as the information comes in, debiting the account as the call continues. Thus, a real time system can continuously debit an account for charges as they occur, additionally debiting one time charges as those occur, such that the balance at any point in time can be monitored, and transactions refused or discontinued based on the account balance. Thus, real-time is the ability to control the transaction at any required point and real time control means the ability to control the decisions with respect to the transaction at any required point prior to, during and post transaction without any perceivable time delay. For example, if a telephony call is in progress and one would like to take a decision on whether to allow the continuation of the call every second, or every half-a-second, a real-time system would be capable of allowing such a control whereas a non-real-time system would not be capable of allowing such a control. A related concept is batch processing, where information is accrued for a period of time, then implemented in a predefined order. For example, a batch system will accumulate information such as the fact that a telephone call is ongoing and apply it at predetermined times, such as billing every minute. Batch processing, when done fast enough, is sometimes considered to be the equivalent of real time processing. However, as will be appreciated further from a description of embodiments of the invention herein, real time processing has several advantages over fast batch processing.

As used herein, a pre-paid transaction is a pre-authorized transaction where value is deposited into an account before the transaction is allowed to proceed. A post-paid transaction is a pre-authorized transaction where the transaction is approved based on the credit rating of the parties to the transaction. By the nature of business, most transactions must be authorized by all parties involved before the transaction can proceed. The purpose in describing a transaction herein as pre-paid or post-paid is to highlight where credit risk is allocated. In a pre-paid transaction, the user accepts the risk that a service provider will provide the service. In a post-paid transaction, the service provider accepts the risk that the user will eventually not pay. A pre-paid transaction therefore can assume greater risk, because the risk of payment is reduced. Therefore, while the term pre-paid is used herein to highlight additional risks or risk reduction, various exemplary embodiments of the invention may utilize recharge or other mechanisms that do not fall into the classical definition of pre-paid.

A convergent interface can have a number of required and optional parameters, which can be configured to integrate with third party system(s), by analyzing the input/output parameters that the third party component(s) require, mapping the third party components to the exemplary convergent communications platform component parameters and configuring the components to resolve any conflicts. If a third party system cannot provide some optional parameters, the exemplary convergent communications system and method can create dummy parameters to ensure a correct mapping.

Examples of a platform include a system that provides a base for additional endeavors. For example, a communications platform such as a telephone system allows for data to flow across it for communication in many ways. Similarly, a convergent communications platform can allow a variety of technologies to merge, allowing for enhanced mobile commerce, electronic commerce and customer care.

Examples of enhanced services include such features as reformatting, interactive voice response, voicemail services, mobile commerce services, and other known services. The enhanced service of reformatting can, for example, reformat a data request from one system so that it is acceptable to a second system and reformat information with reference to stored information such that the reformatted information includes information not available to the first system.

Examples of transaction providers include those that provide transaction products and services, delivery services, insurance services, accounting services, production services and others that enable or assist a transaction to occur. A delivery service provider can be at least a roaming telephone system provider, a long distance telephone provider, a home network provider, a local package delivery company and a national package delivery company. A transaction service provider can be at least a risk assessment provider, a hosting provider for the method and a commercial credit company.

FIG. 1 is a block diagram of an exemplary system utilizing a convergent communications platform to implement the rule set for exchanges of value. As seen in FIG. 1, the customer, via his/her input 10 connects through device IP 21, wireless device 23 or telephone system access device 25, and the internet 22, wireless network 24 or publicly switched telephone network 26 to a vendor (i.e., a service provider) service device 50. The vendor service device 50 then connects to convergent communications platform 100 via a request for payment 52. The convergent communications platform 100 then returns a payment authorization 102 to the vendor service device 50. The vendor service device 50 then can deliver or confirm delivery of the services/goods 11 back to the customer input 10.

In this exemplary system, a customer wishing to engage in mobile commerce can quickly and efficiently receive the services/goods he desires. For example, if a customer wishes to buy an MP3 file from an electronic music vendor, the transaction can work as follows.

The customer, operating the customer input 10, attempts to connect to the music vendor via the vendor's service device 50. The customer input 10 can be connected to any one of the IP device 21, the wireless device 23 or the telephone system access device 25. The IP device 21 can be a network card, a WAP connection device, an SMS messaging device, or any other now known or later devised device for connecting to an internet protocol network.

Wireless device 23 can be a mobile phone, a cellular phone, or any other device that uses radio waves or electromagnetic energy to communicate with the wireless network 24. The telephone system access device 25 can be a modem, a router, a cable modem, or any other device that can connect to the publicly switched telephone network 26.

The internet 22 can be any combination of switches, routers, hubs, microwave devices or other communications equipment that can transfer internet protocol messages from one point to another. The wireless network 24 can be any system of radio towers and switches and other devices such that a wireless device 23 can connect to a vendor service device 50.

The publicly switched telephone network 26 can be any combination of circuit switch, packet switch, or other devices suitable for connecting a telephone system access to the vendor service device 50.

If the customer input 10 was a wireless device 23 and connects through the wireless network 24 to the vendor's service device 50, the vendor service device 50 can be a Morse or numeric recognition system such that the customer input 10 can adequately specify a request to purchase the MP3 from the vendor service device 50.

The vendor service device 50 can be any combination of a web server, a voice server, an SMS messaging server, or Wireless Access Protocol (WAP) server capable of conducting mobile commerce and deliver or confirm delivery of services or goods to customer input 10. The vendor service device 50 receives the customer request for an MP3 file and generates a request for payment 52. The request for payment 52 is sent to the convergent communications platform 100.

The convergent communications platform 100 then checks that the user or customer is an authorized user, that the user's account has been authorized to conduct this type of mobile commerce, and that the customer account contains enough money or funds to enable the service. If the user's account has the correct authorization and funds, the convergent communications platform 100 generates a payment authorization 102 and sends it back to the vendor's service device 50.

The vendor's service device 50 can then generate the services or goods, in this case an MP3 file, and sends the MP3 file by any of the internet 22, wireless network 24, publicly switched telephone network 26, or any other shipping network to the customer network or customer input 10. Other exemplary embodiments can generate a shipping order, a subscription, an authorization to access or a production order.

In various exemplary embodiments, the above-mentioned functions can be automated by the system to a greater or lesser extent. In a fully automated environment, the customer input 10 may be an MP3 player connected with a wireless device 23 to a wireless network 24, which automatically sends both authorization and routing data to the vendor service device 50. Thus, all a user has to do is open the device and select that they would like to purchase a new MP3 file. The device then automatically connects to the MP3 vendor, and displays a list of songs for the user to purchase. The user can then simply select the song he wishes to purchase, and then begin downloading the song as all other individual tasks happen in the background.

In another exemplary embodiment, additional security for authorization of a request for services/goods and payment may be utilized through the use of a pin, a smart card, a magnetic read/write device, a barcode, a magnetic strip, a raised alpha numeric character, or any other antifraud method as now known or later devised.

Figure 2:
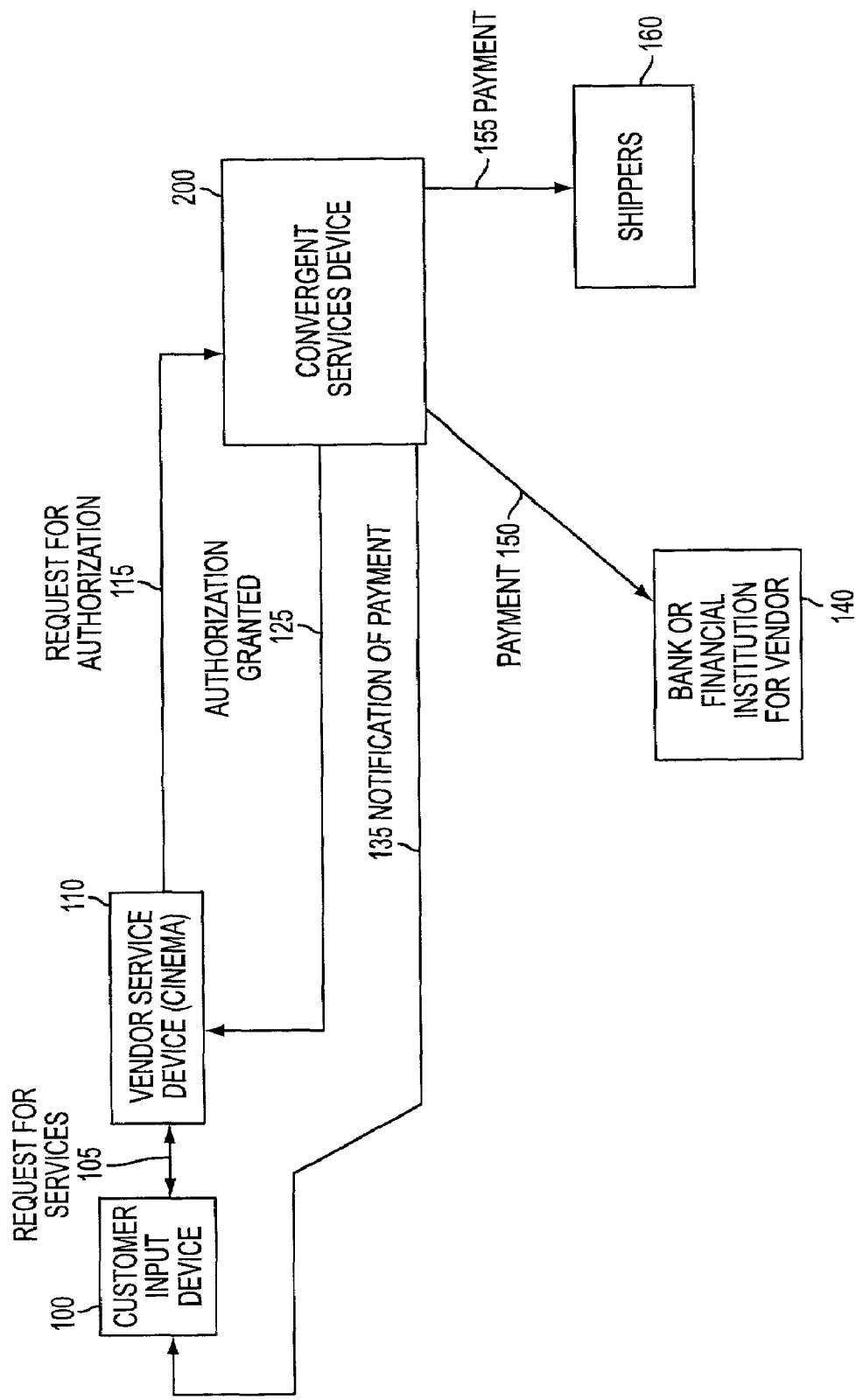
FIG. 2 is an exemplary embodiment of utilizing a convergent communications system and method for mobile commerce.

FIG. 2 is a block diagram showing an exemplary system for utilizing a convergent service device in mobile(m)-commerce or electronic (e)-commerce. As shown in FIG. 2, customer input device 100 sends a request for services 105 to a vendor service device 110. The vendor service device 110 then sends a request for authorization 115 to convergent services device 200. The convergent services device 200 then sends an authorization granted 125 to the vendor service device 110, and a notification of payment 135 to the customer input device 100. The convergent services device 200 then sends a payment 150 to the bank or financial institution for vendor 140 and payment 155 to shipper 160.

In this exemplary embodiment, the customer via his input device 100 requests to buy tickets for a cinema. The customer can open his/her customer device 100 or activate it such that a request for services 105 is sent to the vendor service device 110. The vendor service device 110 can be any now known or later devised device for voice recognition or digit interpretation such that the user can select the particularized movie tickets for the particularized movie house that he/she wishes to visit. In addition, the vendor service device 110 can operate for any known business, not just a cinema. For example, concert tickets or other items could be purchased.

After the user enters the request for services 105 into the vendor service device 110, the vendor service device 110 can generate a request for authorization 115. The request for authorization 115, can include such information as the customer ID, the cost for the services and the vendor identifier (ID).

Once the convergent services device 200 receives the request for authorization 115, it can check the user's prepaid account associated with the user's ID, check that the account is authorized for purchase of movie tickets, and check that the customer's account has sufficient balance. If the account has sufficient balance, the account is authorized for the transaction, and the account is a valid account, the convergent services device can send an authorization granted 125 to the vendor service device 110 and a notification of payment 135 to the customer input device 100.

The customer can then pickup the movie tickets from the movie theatre by any method now known or later devised. For example, the user can enter a dispensing machine identification number, and have the dispensing machine simply dispense the movie tickets. Other means as are known in the art, such as Federal Express delivery, entering an authorization code to a pre-existing machine, and identifying oneself to a vendor representative can be used as is well known in the art.

In various exemplary embodiments, the convergent services device 200 may not send the payment to the vendor services device 110. The convergent services device 200 may send the payment to a bank or financial institution associated with the vendor 140. Alternately, the convergent services device 200 may simply authorize a transfer from a bank or financial institution associated with the customer or user to the bank or financial institution for the vendor 140. In addition, the convergent services device 200 may authorize a payment to shipper 160 which can then perform delivery.

Figure 3:
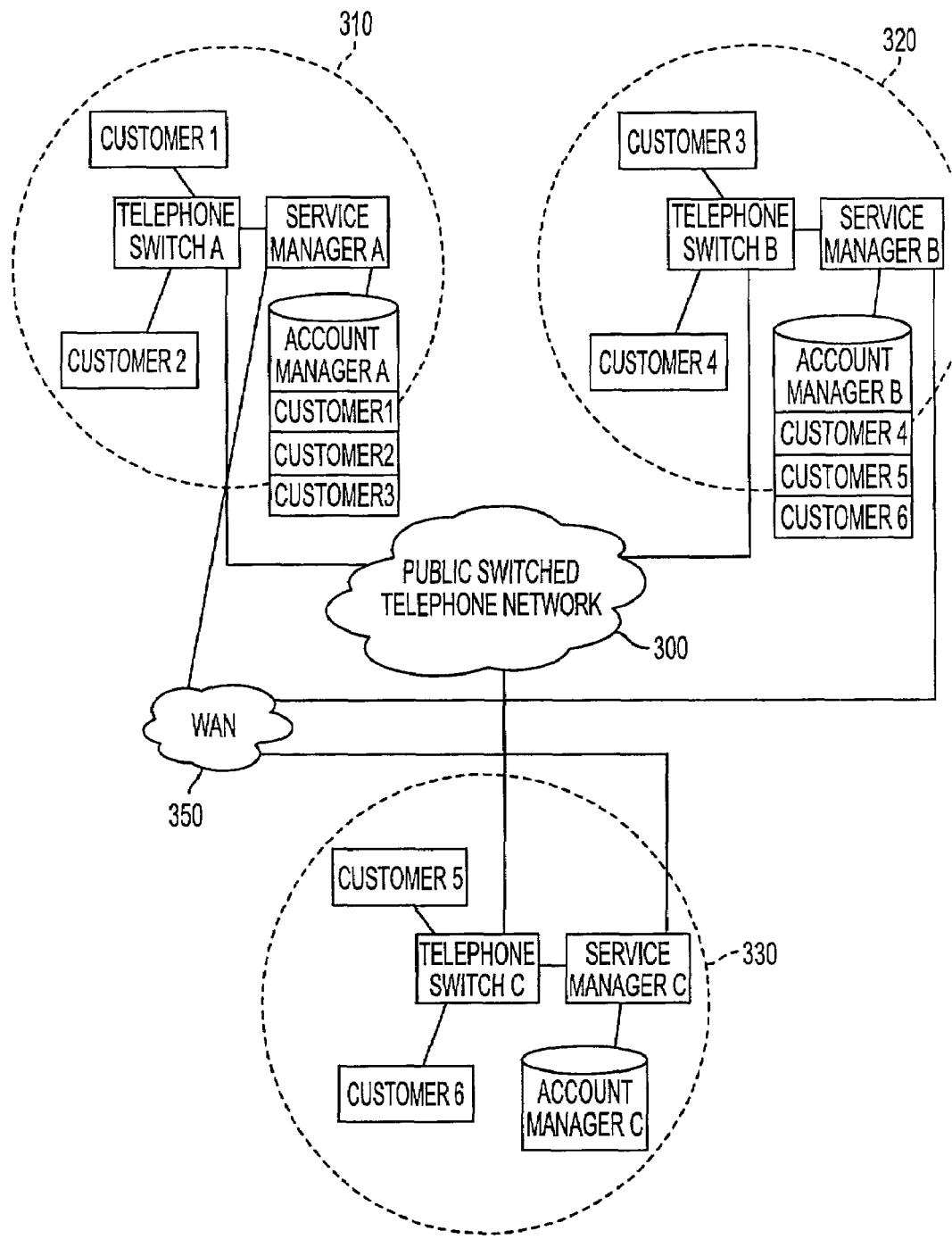
FIG. 3 is an exemplary embodiment of utilizing a mobile commerce server for pre-paid roaming.

FIG. 3 is a diagram showing an exemplary system enabling roaming with a convergent communications platform. In FIG. 3, area 310 has customer 1, customer 2, telephone switch A, service manager A and account manager A in it. Account manager A includes the customer accounts for customer 1, customer 2 and customer 3. Area 320 has customer 3, customer 4, telephone switch B, service manager B and account manager B in it. Account manager B includes the customer accounts for customer 4, customer 5 and customer 6. Area 330 has customer 5, customer 6, telephone switch C, service manager C and account manager C in it. Area 310, area 320 and area 330 are connected by a publicly switched telephone network 300 and a wide area network (WAN) 350.

The use of the wide area network 350 has a secure passage for account information to enable roaming. Thus, if all customers 1-6 are customers with accounts in either area 310 or area 320, the exemplary embodiment enables them to use their accounts regardless of the area they are in. Various examples will be described below.

Roaming can operate as illustrated in the following operations. Customer 1 in area 310 seeking to call customer 2 in area 310 activates his/her device. When the device of customer 1 is activated, the telephone switch A picks up the signal and forwards the request for service to service manager A. Service manager A then checks with account manager A that customer 1 is a valid customer and has an account balance or funds remaining in his/her account. The service manager A also checks that customer 2 is a valid customer with an account balance or funds left in his/her account to receive the phone call. The service manager A after clearing that all accounting information is correct, completes the call.

However, if customer 1 in area 310 wishes to call customer 3 in area 320, under existing systems, there would be a problem. Customer 1 would activate his/her device, and enter in the identification number of customer 3. The telephone switch A would then receive the request for service, and forward it to service manager A. Service manager A would then check that customer 1 and customer 3 are valid customers, and attempt to complete the communication. The service manager A would then work through telephone switch A and a publicly switched telephone network 300 to attempt to reach customer 3. However, at telephone switch B, since customer 3 does not have an account with account manager B, the telephone switch B would not have authorization to complete the telephone call.

However, in various exemplary embodiments of the invention, the telephone switch B would forward the request for service to service manager B, which would realize that customer 3 does not have an account in account manager B, and would therefore forward the request through the wide area network 350 to service manager A. Service manager A would then verify that customer 3 was a valid customer with funds remaining in his/her account. Service manager A would then authorize the call through the wide area network 350 to service manager B, which would tell the telephone switch B to complete the call. If customer 1 or customer 3 were to run out of money or account balance during the course of the telephone conversation, service manager A would forward a signal to either telephone switch A or through the wide area network 350 to service manager B to discontinue the telephone conversation.

In known systems for telephone service, if customer 1 wanted to contact customer 4, customer 1 would activate his/her user device to contact customer 4. The request for service would be received by telephone switch A, which would then send a signal to service manager A authorizing the service if the customer 1 pre-paid account in account manager A was current. The service manager A would then authorize the service as the receiving customer 4 was not part of its account nor on its network. The telephones switch A would then forward the request for service through the publicly switched telephone network 300 to telephone switch B. Telephone switch B would then check that customer 4 was within its area, and check with service manager B that customer 4 had an account. Service manager B checking with account manager B would verify that customer 4 was a current account holder with a remaining balance. Service manager B then would authorize telephone switch B to complete the telephone call and then customer 4 then would be contacted. Thus, there are many ways for the known system to fail. For example, if customer A were in an area that was not covered by telephone switch A, the call would fail.

Figure 4:
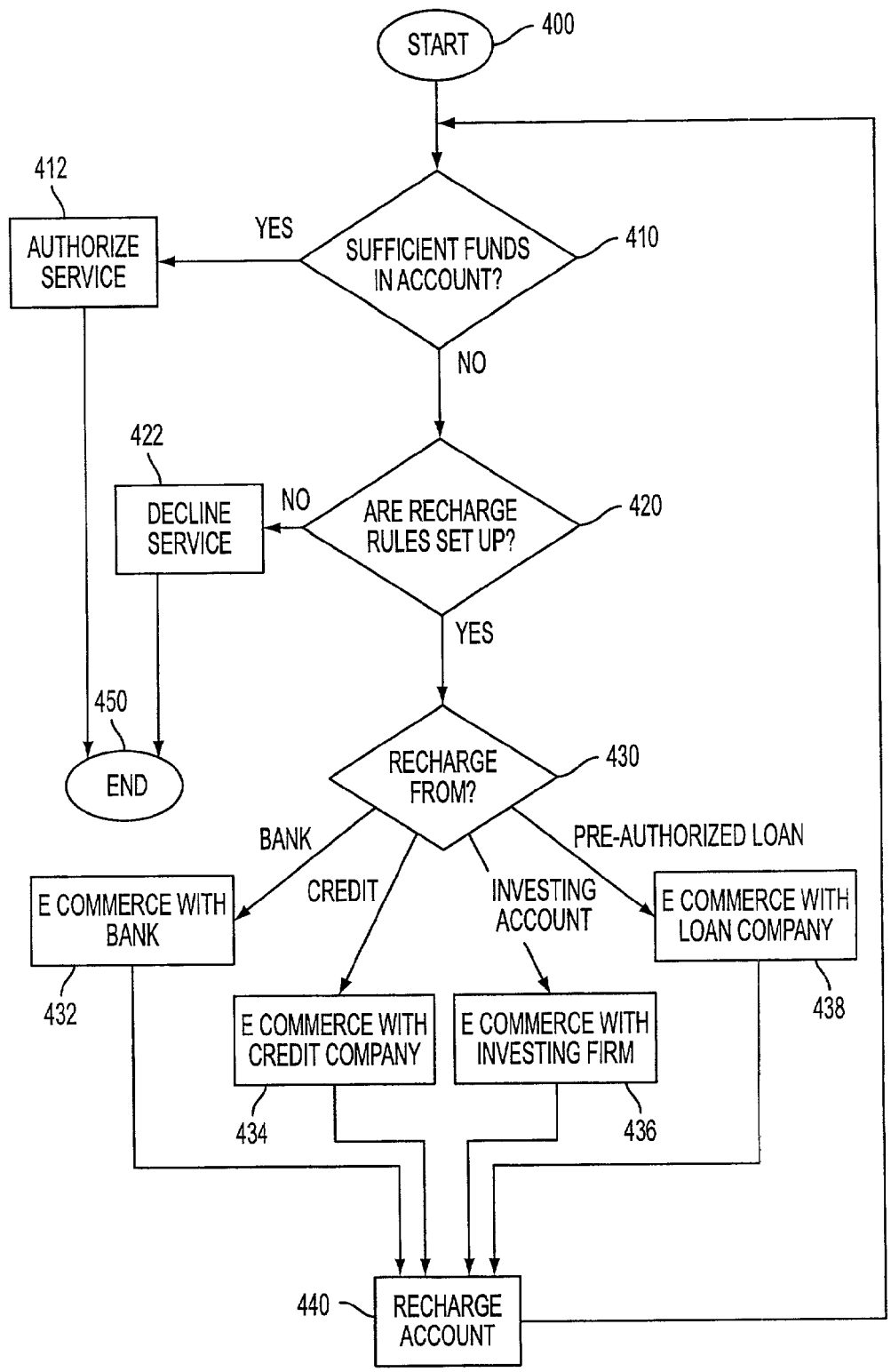
FIG. 4 is an exemplary method of recharging a pre-paid communications account.

FIG. 4 is an exemplary method of recharging a pre-paid customer account for a convergent communications system and method according to several exemplary embodiments of the invention. The method shown in FIG. 4 is an automatic recharge. However, other types of recharge are within the scope of the invention, including additional operations confirming a recharge with the customer, additional operations confirming a recharge with a bank or third party, and additional operations related to checking time or other variables. The method begins at start 400, and continues to determine at 410 if there are sufficient funds in the customer pre-paid account.

In determining if there are sufficient funds in the account at 410, a determination is made whether or not value exists in the pre-paid user's account. If there are not sufficient funds in the account, the method continues at 420 to determine if recharge rules are set up?. If there are sufficient funds in the account, the method goes to authorize service 412. If the method goes to the authorize service operation 412, the method would then to continue to end 450.

If the method continues to "are recharge rules setup?" 420, a determination is made whether or not the customer has authorized pre-paid recharge of his account. If the customer has authorized automatic recharge of the account, the method continues to "recharge from?" 430. If the customer has not authorized automatic recharge of his account, the method goes to decline service 422. If the method goes to decline service 422, the method then continues to end 450.

If the method continues to the "recharge from?" 430, a determination is made to recharge the account by any bank, credit, investing account, or a preauthorized loan. If the "recharge from?" 430 comes from a bank, the method continues to E-commerce with the bank 432. If the recharge is by credit, the method continues to E-commerce with the credit company 434. If the recharge is from an investing account, the method continues to E-commerce with investing firm 436. If the form of recharge is by a preauthorized loan, the method continues to E-commerce with loan company 438. Regardless of the form of the recharge, the method continues to recharge account 440. In recharge account 440, the converging communications platform recharges the pre-paid customer's account and returns to determining if sufficient funds are in the customer pre-paid account 410.

As discussed above, the user can recharge his account from any of several sources. The recharge can be governed by user selections, or rules. For example, a user can predetermine that the first $5,000 of recharge is to come from an investment account, and that thereafter, charges are to come from a credit account. In addition, a user can authorize recharge based on various other variables, such as time, account balances, amount to recharge and other factors. For each recharge account, an agreement is set up between the operator of the convergent communications platform and the recharging entity, and the recharging entity and the customer of both the platform and recharging entity. The agreement can detail such things as the speed of recharge, settlement time frames, notification from the recharging entity of insufficient funds, account balance notification, and other factors as is known in the art. The data relating to the recharge account agreement, rules, and procedures preferably will be stored in the account and/or service manager of the convergent communications platform.

Figure 5:
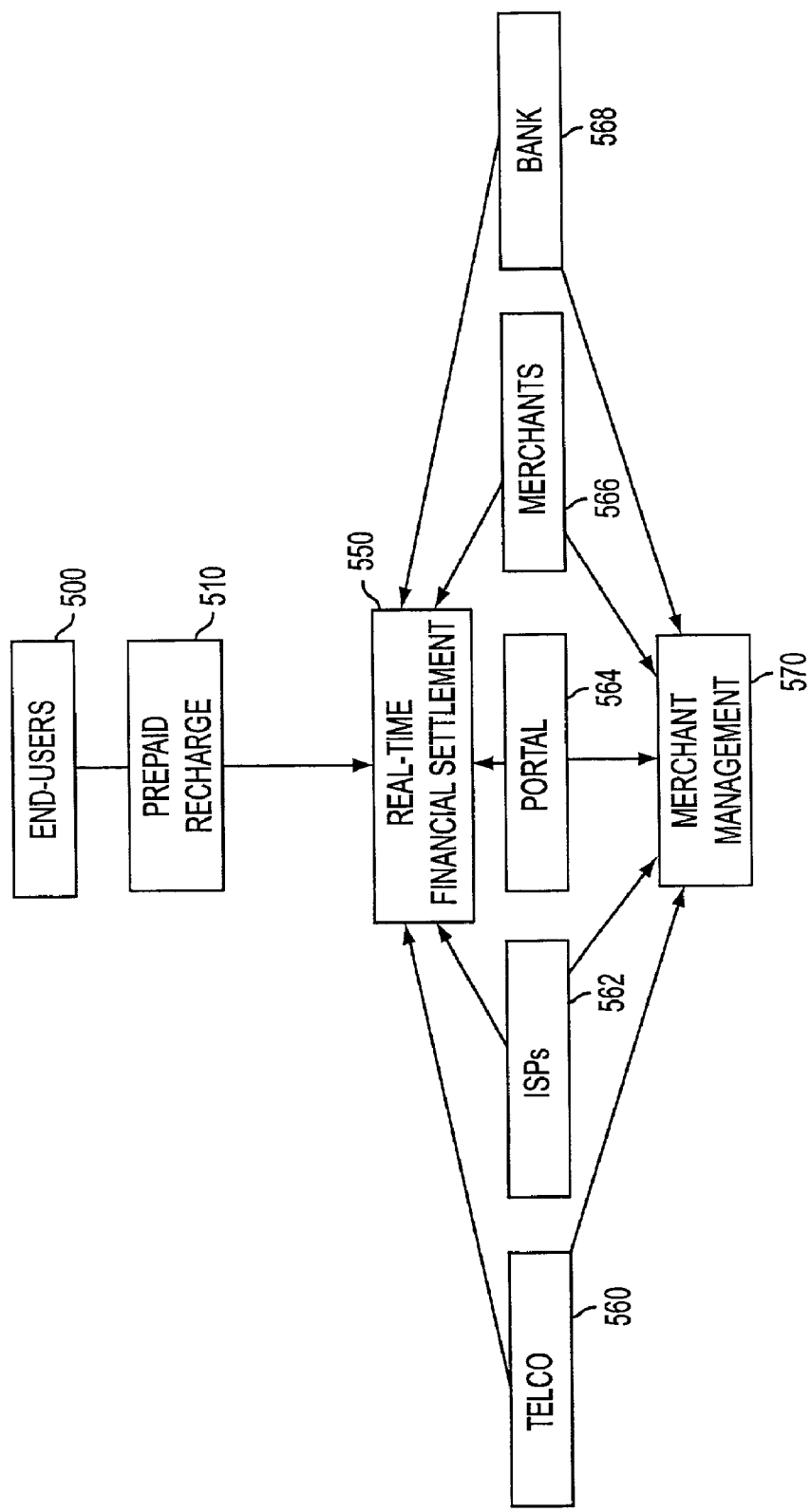
FIG. 5 is an exemplary method of multi-party real time settlement utilizing a convergent communications system.

FIG. 5 is an exemplary method and system for multi-party real-time settlement for services and /or transactions made by a customer with a pre-paid, recharge-type account for a convergent communications system and method according to several exemplary embodiments of the invention. A method begins with end users 500 initiating the method. The method then continues to pre-paid recharge 510.

Figure 17:
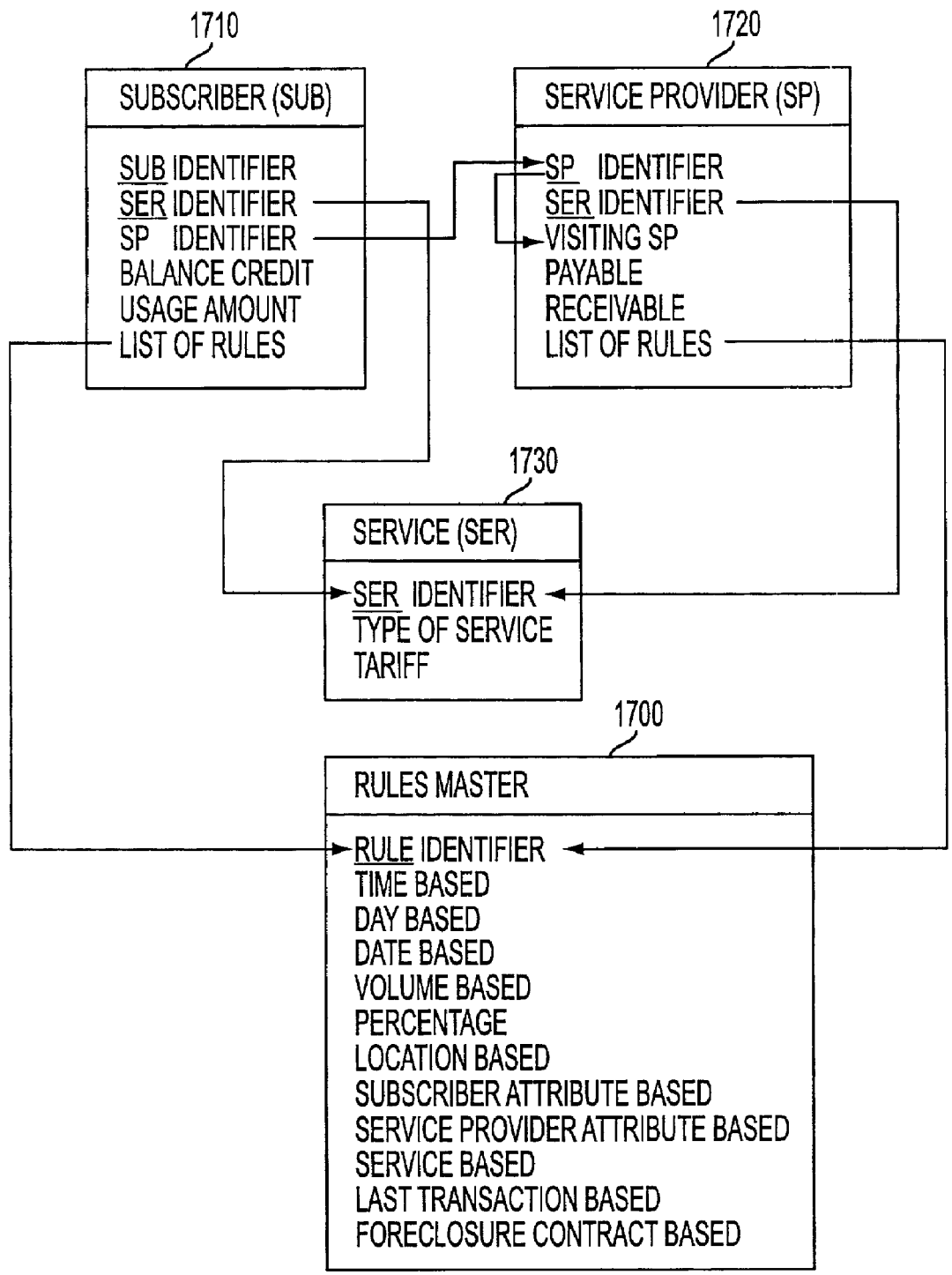
FIG. 17 is an exemplary table layout of a rules repository for a convergent communications system.

In pre-paid recharge 510, a user determines in advance, automatically or at the time of requesting service and/or transactions what other of his off platform accounts and what amounts related to each of those accounts are to be settled using his pre-paid platform account. The method then continues to the real time financial settlement 550. Real-time financial settlement 550 receives requests for payment from telephone company 560, ISPs 562, portal 564, merchants 566 and bank 568. Merchant management 570 is the means for achieving the real-time and direct financial settlement 550. Merchant management 570 specifies whether settlement for the multi-parties involved is to be instantaneous, delayed, involving additional authorizations, or any other features as well known in the art. Thus, there are exemplary embodiments of the convergent communications platform that can settle transactions involving multiple parties over multiple time frames. FIG. 17 shows an exemplary embodiment of implementing the invention, where the rules are imbedded in a table structure.

Figure 6:
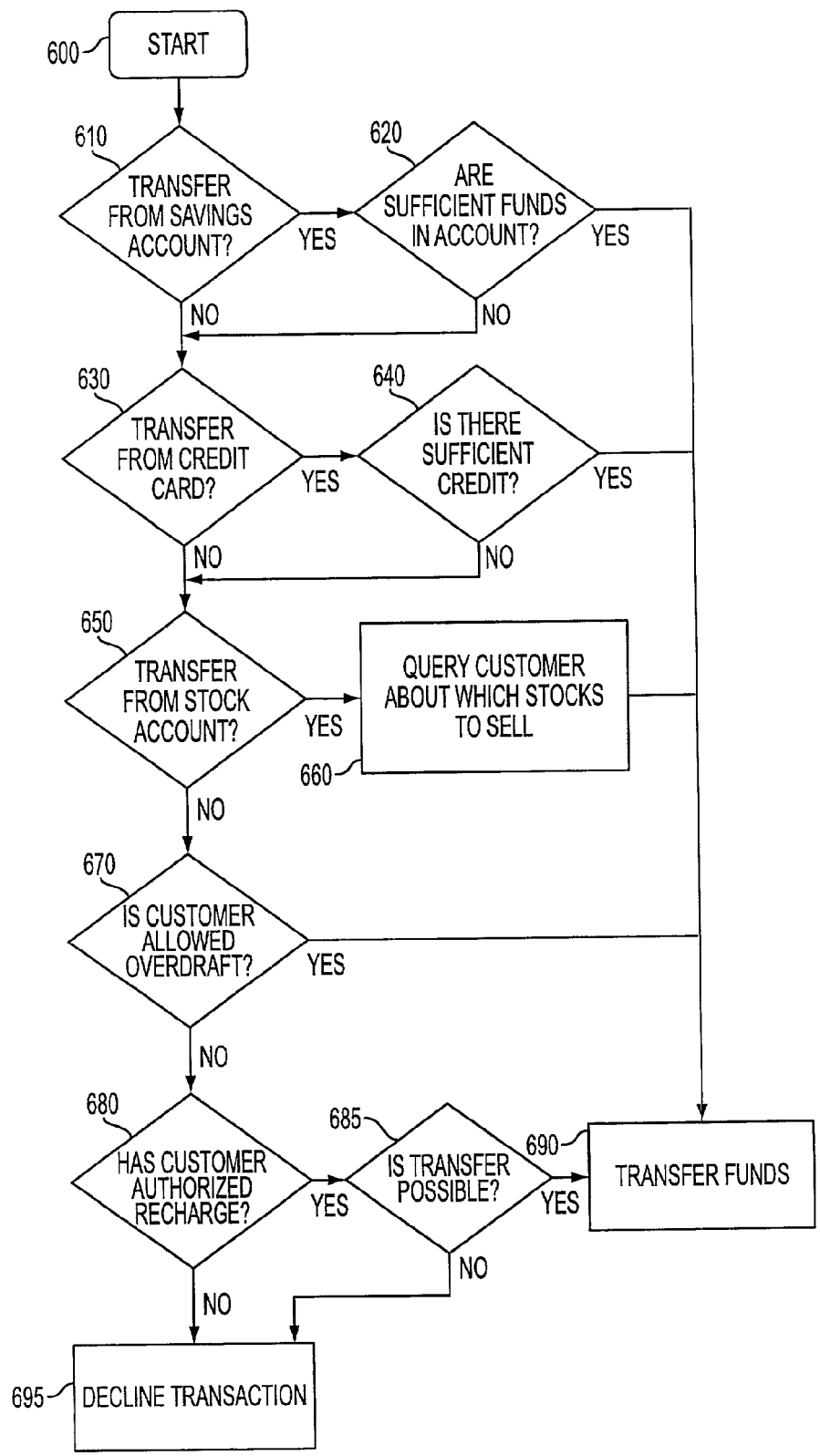
FIG. 6 is an exemplary method of sophisticated account recharge utilizing a convergent communications system.

FIG. 6 shows an exemplary method of recharging a pre-paid customer account for a convergent communications system and method according to several exemplary embodiments of the invention. The method shown in FIG. 6 is a linear progression of questions. However, other various exemplary embodiments may include simultaneous questions, contingent questions and questions with undefined answers. The method begins at start 600 and continues to determining if the transfer should be from a savings account 610.

If the determination is made in determine if the transfer should be from a savings account 610 that the transfer should not be from a savings account, the method continues to determine if the transfer should be from a credit card 630. If the determination is made in determine if the transfer should be from a savings account 610 that the transfer should be from a savings account, the method continues to determining if there are sufficient funds in the account 620. If the determination is made that there are sufficient funds in the account, the method continues to transfer the funds 690. If the determination is made that there are not sufficient funds in the account, the method continues to determining if the transfer should be from a credit card 630.

If the determination is made in determine if the transfer should be from a credit card 630 that the transfer should not be from a credit card, the method continues to determine if the transfer should be from a stock account 650. If the determination is made in determine if the transfer should be from a credit card 630 that the transfer should be from a credit card, the method continues to determining if there is sufficient credit in the account 640. If the determination is made that there is sufficient credit in the account, the method continues to transfer the funds 690. If the determination is made that there is not sufficient credit in the account, the method continues to determining if the transfer should be from a stock account 650.

If the determination is made in determine if the transfer should be from a stock account 650 that the transfer should not be from a stock account, the method continues to determine if the customer should be allowed overdraft 670. If the determination is made in determine if the transfer should be from a stock account 650 that the transfer should be from a stock account, the method continues to query customer about which stocks to sell 660. Once the customer determines a number of stocks to sell, the method continues to transfer the funds 690.

If the determination is made in determine if the customer should be allowed overdraft 670 that the customer should not be allowed overdraft, the method continues to determine if the customer authorized recharge 680. If the determination is made in determine if the customer should be allowed overdraft 670 that the customer should be allowed overdraft, the method continues to transfer the funds 690.

If the determination is made in has the customer authorized recharge 680 that the customer has authorized recharge, the method continues to determine if transfer is possible 685. If the determination is made that the customer has not authorized recharge or that the transfer is not possible, the method continues to decline transaction 695. If the determination is made in determine if transfer is possible 685 that the transfer is possible, the method continues to transfer funds 690.

Each pre-paid customer can configure his own criteria for recharge in at least the following manner: (1) recharge only from phone (mobile or fixed), (2) recharge from the net (internet, mobile internet or any other types of public or private networks), (3) recharge only when the customer specifically asks for recharge (either thru IVR, net, or walk in, or any other manner), (4) recharge automatically when the balance is going below a certain value automatically from another particular account (bank debit or credit or any other type of account), (5) do not recharge the account, but use another account as a payment guarantee for the pre-paid account, recharge several sub-accounts with pre-configured limits from the main account, (6) recharge on a periodic basis (e.g., daily, monthly, weekly, etc.), (7) recharge amount to be determined based on usage criteria as defined by the user (e.g., look at the past seven days usage and recharge the average amount; or the recharge amount should be equal to the value of the most expensive transaction conducted in the past 'x' number of days, etc.), (8) recharge rules according to the service provider, (9) recharge rules according to the "owner" of the customer (could be one of a number of different service providers or a combination of two or more that "own" the customer and can dictate the rules to that customer), (10) recharge rules based on the main "account holder" rather than a sub-account holder (such as a parent/child or in a hierarchical sense), and (11) recharge rules dictated by the owner of the device that provides the recharge (i.e., phone, agent, ATM, POS, etc.).

These recharge methods may also vary across different types of devices, across different networks, across different recharge modes (IVR, agent, etc.) and according to rules within country or jurisdiction. In addition, these modes, devices, networks, etc., may all be combined to make different rules or allow different combinations or permutations to occur. For instance, a person with a business account uses an IVR from their cell phone to add money from the business operating account to his phone for m-commerce reasons. Rules dictating how this is done and how much money may be added to the phone's account could be regulated by legal restrictions against businesses in that country. Were the same individual to recharge elsewhere using the same rules and modes, devices, etc., the rules could be different.

Figure 7:
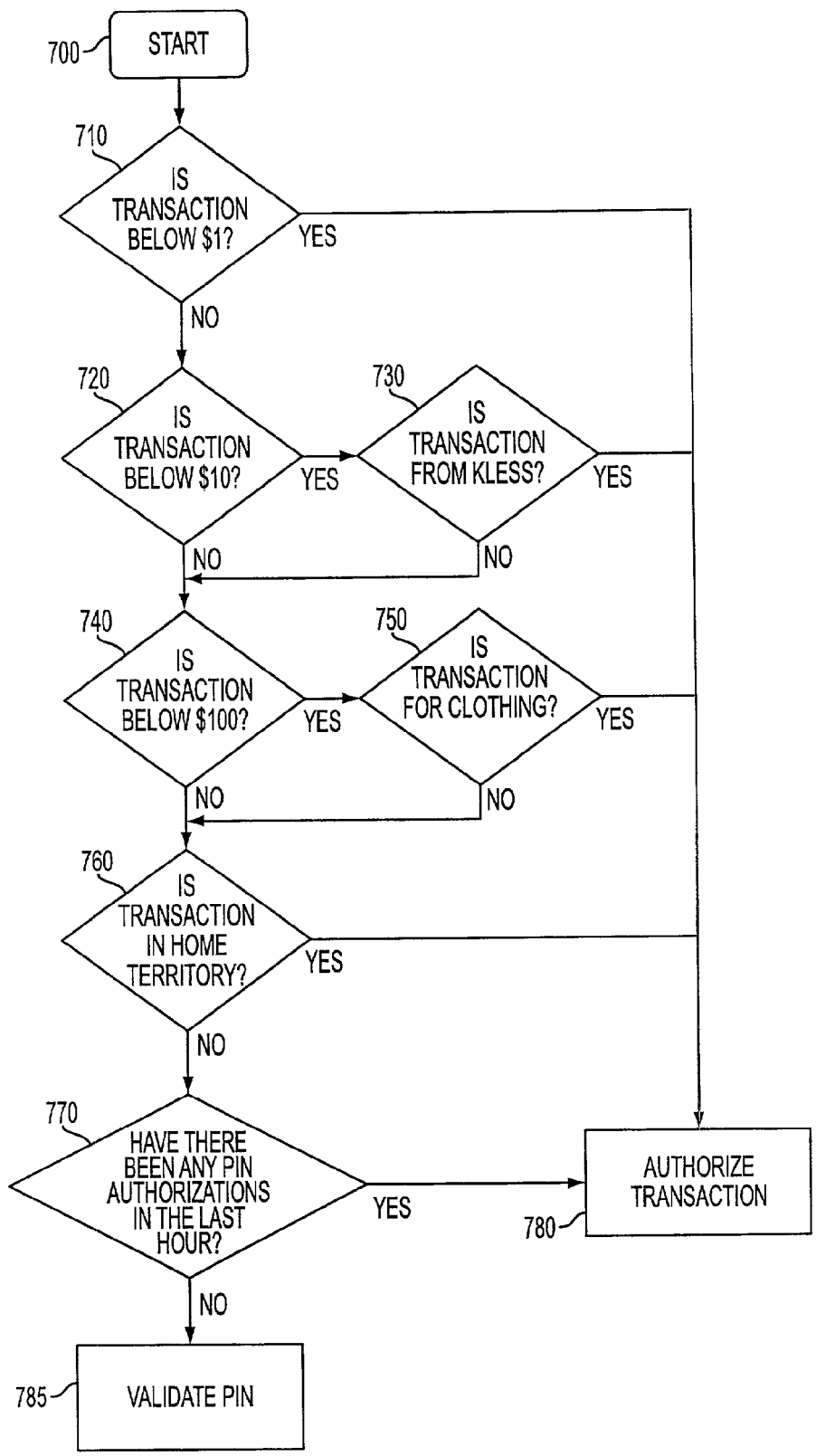
FIG. 7 is an exemplary method of sophisticated transaction authorization utilizing a convergent communications system.

FIG. 7 shows an exemplary method of authorizing a pre-paid customer account for a convergent communications system and method according to several exemplary embodiments of the invention. The method shown in FIG. 7 is a linear progression of questions. However, other types of progression are within the scope of the invention, including simultaneous questions, contingent questions and questions with undefined answers. The method begins at start 700, and continues to determine at 710 if the transaction is below $1.

In determine if the transaction is below $1 710, a determination is made whether or not the transaction is below a de minimus amount, namely $1. If the transaction is above $1, the method continues to determining if the transaction is below $10 720. If the transaction is below $1, the method continues to authorize transaction 780. If the determination is made in determine if the transaction is below $10 720 that the transaction is above $10, the method continues to determine if the transaction is below $100 740. If the determination is made in determine if the transaction is below $10 720 that the transaction is below $10, the method continues to determining if the transaction is from Kless 730. If the determination is made that the transaction is from Kless, the method continues to authorize the transaction 780. If the determination is made that the transaction is not from Kless, the method continues to is the transaction below $100 740.

In determine if the transaction is below $100 740, a determination is made whether or not the transaction is below a determined amount, namely $100. If the transaction is above $100, the method continues to determining if the transaction is local (in the home territory) 760. If the transaction is below $100, the method continues to determine if the transaction is for clothing 750. If the determination is made in determine if the transaction is for clothing 750 that the transaction is for clothing, the method continues authorize transaction 780. If the determination is made in that the transaction is not for clothing, the method continues back to determine if the transaction is local 760. If the determination is made in is transaction local 760 that the transaction is non local, the method continues to have there been any pin authorizations in the last hour 770. If the determination is made that the transaction is local, the method continues to authorize the transaction 780. Finally, if a determination is made that there have not been any PIN authorizations in the last hour, the method continues to validate PIN 785. If the determination is made that there have been PIN authorizations in the last hour, the method continues to authorize transaction 780.

Thus, for example, a company administrative person goes to the Office Depot department store near work to purchase work supplies. The administrative person chooses the supplies and approaches the check out stand. The administrative person indicates he would like to use the exemplary inventions point of service system of the Office Depot store to transfer money from the business operational account at Brad company to the Office Depot account to cover the supplies chosen (rules: does the store offer the exemplary inventions point of service system, does the clerk have the information available to use the system, is the business part of the exemplary inventions point of service system, is there anything required beyond the account number/PIN number). The clerk rings up the purchase and allows the administrative person to input the business account code in the point of service machine (rules: does the account code match the system's required character string, numbers, letters). The exemplary inventions point of service system checks that the company business account is a valid account by accessing the National Bank Account register via the exemplary inventions point of service system and the exemplary Gateway (rules: what banks and accounts are part of the exemplary inventions point of service system, what is allowed via the system).

The register indicates the company business account is a valid account at the company and requires the administrative person to input a PIN number (rules: is this person a valid user, does this person have authority to spend via this system, does the PIN number match that on file and what limit is allowed). The exemplary inventions point of service system notifies the clerk of the company business account's validity and then checks the company business account rules to see if the account is valid and that the account can receive charges (rules: does the account accept charges like this, what is the limit). The clerk receives authentication that the company business account is valid and able to receive charges (rules: the clerk receives several options which she offers the administrative person, these include receipt or not, revolving account or not, pay some via cash/the remainder on account or not). The clerk also receives a notice that the administrative person's PIN is valid and that the administrative person has a certain purchasing authority. The clerk provides the amount to be transferred/paid from the company business account to the Office Depot account, to the administrative person. The administrative person agrees with the payment. The exemplary point of service system (via the exemplary Gateway) notifies the company business account and the Office Depot account of the pending transaction (rules: when does the money actually transfer, what is the split between the parties, when does split happen, what information is provided to the parties). The transaction is processed via the exemplary inventions point of service system and the exemplary Gateway (rules: timing associated with the processing). A receipt with confirmation is provided to the administrative person (rules: what information is on the receipt, what other options are available). A confirmation is provided to the Office Depot clerk (rules: what internal operations are required for the clerk, is there a print out of the confirmation, does the amount get added to the cash, the charges, the credit charges, other categories, etc.).

Thus, in an exemplary convergent communications system and method, transaction validation/authentication (whether a communications service or a commerce transaction, or a combination of both) can have several operations or checks to validate the user, as well as the availability of a credit limit or pre-paid monies associated with the account. Various exemplary embodiments using the communications access, internet or mobile/internet access, commerce transaction (whether done in a physical shop or on the net/mobile-net) can allow for validation: customer validation based on PIN input, validation based on password entry, validation based on telephony related security features, a combination of some or all of the above, validation that the requested service/transaction is authorized or not for a particular customer pre-paid account (service profile validation), validation of availability of sufficient balance in the customer pre-paid account for the services/transaction (balance could be in the pre-paid account balance, or a credit account balance or any other type of real or virtual account associated with the customer pre-paid account), validation based on a matrix across different amounts across different service providers. For example, for different amounts a bank may just require a 4 digit PIN for authorization, a telephone company may require just the address for a transaction less than $20, but zip code and social security number for any transaction over $50, a credit card issuer may require address, zip code, social security number, mother's maiden name and last charge made on the account.

Further, based on the specific authorization process, the rules could change. For instance, if a person was not able to answer a basic question such as "what is your current address", the rules for authorization could immediately change to add two more questions, which the service provider has determined are important to its authorization requirements. If the person requesting authorization is able to answer those two more questions, then authorization is granted. If not, another question is asked or the person could be put into a queue for a live authorization request based on rules configured by the service provider (bank, telephone company, merchant or any other type of service provider). For example, the service provider could: ask for additional information from the user (e.g., mother's maiden name, date of birth or value of the previous transaction done, or value of the previous bill, previous recharge or matching of a personal question and answer pre-defined by the customer), ask for special passwords for high value transactions (e.g., more than $20) or high volume of transactions (e.g., more than fifteen transactions in a day, or more than fifty transactions in a month, etc.). Thus, based on rules configured by the customer or the service provider additional validations may be used instead of just refusing the transaction. As can be seen from the description above, the rules can be part of an interactive process based on a set of rules either established by the customer or service provider and can allow for fraud prevention through interactive communications between the customer and the service provider for certain transactions.

For example, the customer/user can set up: additional passwords for certain types of transactions (e.g., buying of airline tickets), additional information to be requested by the system (e.g., date of birth, friend's name, special passwords) in case of a transaction value higher than a set of previous transactions (e.g., asking a special password if the current transaction value is 50% more than a total of the past five days transactions together). Based on rules configured by the customer/user, the system can block certain types of transactions (e.g., all e-commerce and mobile commerce transactions allowed with an exception of pornography or money transfers between countries where currency restrictions exist).

Thus, a rule which says that a $20 transaction to purchase a train ticket may be authorized so long as there is a prepaid balance of not less than zero (allowing a $20 overdraft in other words) where the requester is age 60 years or above and the request is made outside banking hours. Thus, several exemplary embodiments can use criteria that are defined by economic characteristics, transaction-type characteristics, requestor characteristics and time of day. Thus, the exemplary system can use three-dimensional rules, rules determined by artificial intelligence, a rules matrix that will be applied on a transaction-by-transaction basis or on an account basis. The rules matrix may look different, even for the identical transaction, when a different collaboration of service providers is involved.

Further, as embodied herein, rules could be based on an adaptive or economic basis. For example, the rules could be based on account balance; ability to replenish; currency used; margin rules and interest rates. (These rules could be called algorithmic rule changes.), Other rules could be based on customer profile—e.g. age, occupation, nationality, sex, address, financial history, criminal history, memberships, transaction history, transaction profile—e.g. service type, content type, quantity requested, purchase of a certain category of product. Rules could change based on history, logic, fraud and security reasons by any number of people in the chain, including service providers, merchants and customer, or merchant profile—e.g. location, type, business web collaborations, etc.

Further, the rules as embodied herein, could be based on "fuzzy" or advanced logic, such as artificial intelligence. For example, an analysis of a customer's voice could rank voice quaking, inflection and accent to determine the stress level of a customer, which may thereby affect the determination to authorize a transaction. The artificial intelligence system can also have learning capabilities that allows decision making based on various past events of a specific individual customer (even though no single event has any specific impact on the decision made). For example, the system can analyze the debit transactions over a period of a specified number of months and arrive at a spending behavior of the individual. When a request for a new transaction is initiated, if it broadly matches with the buying pattern, then the system can allow the transaction. If not, the system can mark it as a potential fraud and conduct additional validations. If the validations are properly completed, then the system authorizes the transaction and includes the transaction into the knowledge base for arriving at a new spending behavior for the individual.

As embodied herein, the system can also have learning capabilities that allow decision making based on various past events of a set of customers (eg., all teachers, all teenagers, all women above 55 years who live in Dallas, etc). When a request for a transaction is initiated, the system can analyze the buying pattern and if it broadly matches with the group behavior pattern, then the system authorizes the transaction. For example, what are the chances of a lady aged 62 years who belongs to a very small town in Texas to ask for approval for downloading pornography from a site in Brazil while her physical location is in Indonesia. The system may provide additional authentication because the transaction may be a potential fraud situation.

As embodied herein, the system can also have learning capabilities that allows decision making based on various past events of a specific individual customer (even though no single event may have specific impact on the decision made). For example, the system can analyze the transactions over a period of a specified number of months and arrive at a spending behavior for an individual. When a request for a new transaction is initiated, if it broadly matches with the buying pattern, then the system authorizes the transaction. If not, the system identifies it as a potential fraud and conducts additional validations. If the validations are properly completed, then the system authorizes the transaction and includes the transaction into the knowledge base for arriving at a new spending behavior for the individual.

A particular feature of various exemplary embodiments is that debit occurs in real time. Thus, service providers are protected from a customer overcharging an account when two charges arrive at close to the same time. In addition, real time debiting allows for dynamic accounting for all charges, not simple one-time access fees. For example, a roaming telephone call can credit the roaming network based on the length of the call, not just a one time roaming charge. This enables fraud prevention in several distinguishable ways.

Service providers of all types have a common problem in managing and controlling fraud. Whether the service provider is offering a pure communication services, or commerce services or financial services or any other type of service, fraud is one of the biggest threats to their business. In general, fraud is defined as "loss of revenue" caused by any reason. Traditionally, vendors and service providers have recognized this problem and have come out with a number of solutions that attempt to minimize fraud. Thus far, solutions offered analyze potential fraud by understanding certain fundamental issues. These fundamental issues are: motive—what is the fundamental objective for the fraud (examples: make money, criminal tendencies, hacking, etc.), means—what is the nature of the fraud (examples: call selling/premium rate service, etc.), mode—what is the generic fraud method (examples: subscription fraud, surfing, ghosting, etc.) and method—what is the specific fraud method (examples: subscription, roaming, etc.).

The methods adapted in the various cases as noted above can be generally classified. A first type is subscription fraud—when the subscriber takes a connection for high usage, but has no intention to pay. A second type is call selling fraud—when the subscription is used for selling the calls to others at subsidy, but the subscriber has no intention to pay. A third type is premium rate service (PRS) fraud—whereby, the PRS content provider itself abuses the network by generating calls to its own PRS numbers to collect the commission; but escapes paying to the operator for the calls generated. A fourth type is roaming fraud—where the roaming subscriber uses the network/services heavily, but has no intention to pay. A final type of fraud is internal fraud—where the employees of the service provider use their knowledge to tamper with the systems thereby helping others commit fraud.

Service providers worldwide are constantly working to learn and understand the issues surrounding the different types of fraud and how to put sufficient measures in effect to detect, analyze, respond and prevent the frauds. One particular advantage or the exemplary system is that the effectiveness of the exemplary embodiments actions are continuously measured and the findings can be fed back into the system as improvements.

A number of fraud management systems are available in the marketplace today with varied levels of sophistication.

Service providers generally manage the fraud by implementing such systems and a set of business processes. For example, obtaining the credit rating from credit rating agencies, physical verification of the customer and his residence, obtaining confirmation from other service providers that the person/entity has honored its past obligations to pay, setting up of very sophisticated collection processes, password protection, increased IT security and establishing stronger encryption algorithms.

In the world of communications, service providers today prefer more prepaid customers than postpaid customers due to the risks associated with the various types of fraud. However, conversion of a postpaid customer into a prepaid customer will not eliminate the fraud but will only transfer the fraud liability from one party to another. Potential fraudsters do not care who takes the liability. Hence, it does not have a significant effect on the fraud problem.

In the world of financial services, service providers today prefer debit cards and smart card-based prepaid cards, rather than credit cards for some of these same reasons. The exemplary embodiments of the invention improve on all of these systems by integrating the convergent communications system and method into the authentication process through the use of cellular telephones, access to the electronic mail system, and other connections as described herein.

For example, a customer may make a request for authorization for any two or more services (two or more communication services, one or more commerce services, or a combination of communication and commerce services) using his phone, internet device, any point of sale device, credit card, debit card or bank ATM. Such a request would go through the normal fraud validation procedures of each of the service providers, and if the outcome is positive it would be further validated by the exemplary convergent communications system and method for the combination of services. If, during the course of validation, if the request is suspected as a possible fraud, then the service provider can initiate a conversation with the customer (either voice or data conversation) and conduct additional validations. Such validations could be based on customer-configured parameters. For example, whenever, a customer tries to buy something beyond $25, additional validations are conducted. Additional service provider configured parameters can also be used. For example: any request for over $25 should go through additional validations and any request for purchase of goods/services when the customer is roaming should go through additional validations based on both home service provider and visiting network service provider. Other profile/category/usage based configuration parameters can be used. For example: sudden, unexpected volume of authorization requests, sudden, unexpected authorization requests from remote locations and service type is generally not used by the category of customers.

Thus, with the increasing use of sophisticated technology and more sophisticated business processes, service providers around the globe are able to reduce potential fraud. The biggest challenge service providers are facing today is the fact that irrespective of number of rules and business processes they have set up, fraud still takes place.

For example, the industry at large has recognized the fact that the best way to eliminate/minimize fraud is to control the fraud attempt at the point at which it is taking place. Any request that has a business impact can be a potential fraud. As a result, currently available fraud management solutions focus on approving or rejecting the request based on a set of rules. These solutions are based upon the assumption that any request that fulfils a set of rules is a good request and any request that does not is a fraud. However, in real life, a customer who fulfills all the criteria can still turn out to be a fraudster and, on the other hand, a customer who looks like a fraudster, in reality can turn out to be a good customer who had no intention to fraud.

With the convergence of communications and commerce, a number of parties must come together to fulfill a single need of the customer. Each of these service providers has an associated risk dealing with fraud in their service provisioning. Any convergent service aggregates the risk of all participating service providers. In effect, the resultant fraud management capability of the combined service is the least common denominator of the fraud management capabilities of each of the service providers (i.e., the weakest link scenario). As a result, the potential for fraud increases dramatically with the number of service provider-parties involved in offering the service.

Currently available fraud management systems do not address the issue related to multiple parties. They are single service fraud management solutions with varied levels of sophistication. They do not offer solution based on the combined risk associated with the converged services brought by various service providers. Various exemplary embodiments as described herein can be used to reduce and eliminate fraud.

Figure 8:
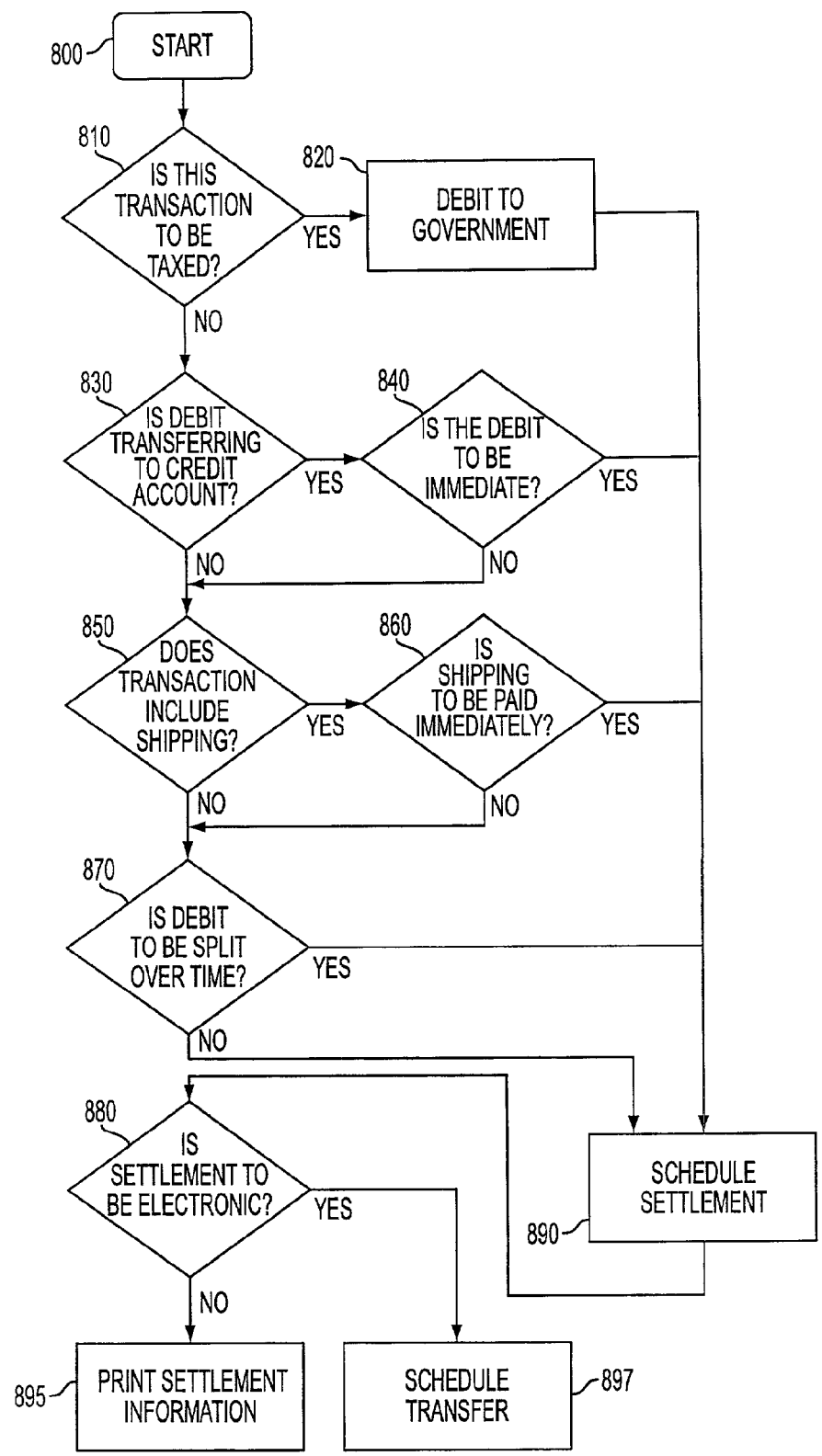
FIG. 8 is an exemplary method of sophisticated real time account debiting utilizing a convergent communications system.

For example, FIG. 8 shows an exemplary method of debiting a pre-paid customer account for a convergent communications system and method according to several exemplary embodiments of the invention. The method shown in FIG. 8 is a linear progression of questions. However, other various exemplary embodiments of the invention may include simultaneous questions, contingent questions and questions with undefined answers. The method begins at start 800 and continues to determine if this transaction is to be taxed (tax-free) 810.

If the determination is made in determine if this transaction is to be taxed 810 that the transaction should be tax free, the method continues to determine if the debit is transferring to a credit account 830. If the determination is made in determine if this transaction is to be taxed 810 that the transfer should be taxed, the method continues to debiting to a government account 820. Once the debit to the government account 820 is completed, the method continues to schedule settlement 890.

If the determination is made in determine if the debit is transferring to a credit account 830 that the transfer should not be to a credit account, the method continues to determine if the transaction should include shipping 850. If the determination is made in determine if the debit is transferring to a credit account 830 that the transfer should be to a credit account, the method continues to determining if the debit should be immediate 840. If the determination at 840 is made that the debit should be immediate, the method continues to schedule settlement 890. If the determination is made that the debit should not be immediate, the method continues to determining if the transaction includes shipping 850.

If the determination is made in determining if the transaction includes shipping 850 that the transaction does not include shipping, the method continues to determine if the debit should be split over time 870. If the determination is made in determining if the transaction includes shipping 850 that the transfer should include shipping, the method continues to determining if the shipping should be paid immediately 860. If the determination is made that the shipping should be paid immediately, the method continues to schedule settlement 890. If the determination is made that the shipping should not be paid immediately, the method continues to determining if the debit should be split over time 870.

If the determination is made in determining if the debit should be split over time 870 that the transaction should not be split over time, the method continues to determine if the debit should be electronic 880. If the determination is made in determining if the debit should be split over time 870 that the debit should be split over time, the method continues to schedule settlement 890. If the determination is made that the debit should not be split over time, the method continues to determining if the settlement should be electronic 880. If the determination is made in determining if the settlement should be electronic 880 that the transaction should not be electronic, the method continues to print settlement information 895. If the determination is made in the determination that settlement should be electronic 880 that the debit should be electronic, the method continues to schedule transfer 897.

For example, a consumer goes to an ATM and chooses her department store and inputs the account number of her retail department store Renner. An exemplary embodiment of the system checks whether the store is a member of the system, whether the store offers payment through the system, and does the account number match (characters/numbers/figures) those of the department store. The exemplary system can then use a Gateway to contact the Renner Department Store database to validate the account number. The exemplary system can then also check if the account number matches. The consumer may also use a PIN number to validate her identity and account. The exemplary system can then use a Gateway to contact the Renner Department Store database to validate the account number with Renner. The system can perform the additional validation operation of checking the PIN number against characters of the system and the exact account number associated with the consumer. The system then can access the database and bring back the account balance to the consumer. The system can then check: if the PIN number matches the PIN number in department store records, is there an account balance to bring back and is the account capable of using the exemplary system to charge further or pay off.

Then, the consumer can make a decision to pay off part of what she owes Renner via her credit card as the payment type. The exemplary system check: what does the consumer want to do and what can the consumer do. The exemplary system can check the credit card balance within the bank system, possibly not using the Gateway. The system can then check: what is the balance on the credit card, what is the total credit limit, what is the difference between the credit limit and balance, if the balance is positive, the system can present the consumer with options. The exemplary system then further verifies that there is credit available on the consumer's credit card. The consumer can then agree to pay Renner a proportion of her balance via a transfer from the credit card. The exemplary system can then check: what does the consumer wish to do, what amount should be handled, what amount should be transferred and when should the transfer occur. The bank system can then be used to indicate that the transfer will take place, to physically transfer the money and to check that the money was received. The exemplary system can then check: what checking and confirmation is required by Renner and the credit card company and what receipt options does consumer want. The consumer can then receive a transaction/payment receipt via the ATM showing the payment. The exemplary system can check: what information is required on the receipt, what further information does the consumer want to see and what choices are available for the consumer. The receipt can include a confirmation of the transaction. The transaction is then completed. The exemplary system can then check: does the consumer wish to do anything else and what are the choices.

Thus, these rules are specifically for when money is taken from the account (as opposed to where it is credited after it is debited). Thus, the rules may be based on rules according to the service provider, rules according to the customer's needs (probably seldom used), rules according to a mix of service providers, rules according to the "owner" of the customer, rules according to the "major" provider of services, (i.e., if a merchant sold a CD to the customer for $20 and overnight shipping was $22, then the overnight shipper could dictate when/how the debiting would occur.), rules that change according to the financial institutions' conditions, processes, procedures, rules according to different legislative regulations, rules according to the customer's history, spending limits, monthly average account balance and rules according to predefined agreements between any of the service providers.

Further, the rules could be immediate or a promise to debit later/transfer later and rules could be a combination of the above spread over time. For instance, 50% of the amount could be taken immediately and the remainder could be spread out to two equal debits one week out. Thus, a debit does not have to be just one payment, or immediate debit, it could be multiple debits adding to the purchase price, it could be monthly debits (covering "all you can eat plans"), and other, known ways of structuring a payment.

Further, not all transactions for value will necessarily include a transfer of money. While value may be exchanged, the various transactions may be: free, a benefit of a previously purchased item (like frequent flyer miles), a part of a monthly subscription service or the exchange of value, goods or services that does not include currency (like a merchandizing credit). For example, a free item may be offered for the agreement to purchase additional items within a specified period of time. Other exchanges may include donating an MP3 file for access to another MP3 file. Or a consumer may get access to a mapping program as long as they bank with a certain bank. The exemplary system allows for these types of exchanges within the exemplary structures shown in FIG. 17.

Figure 9:
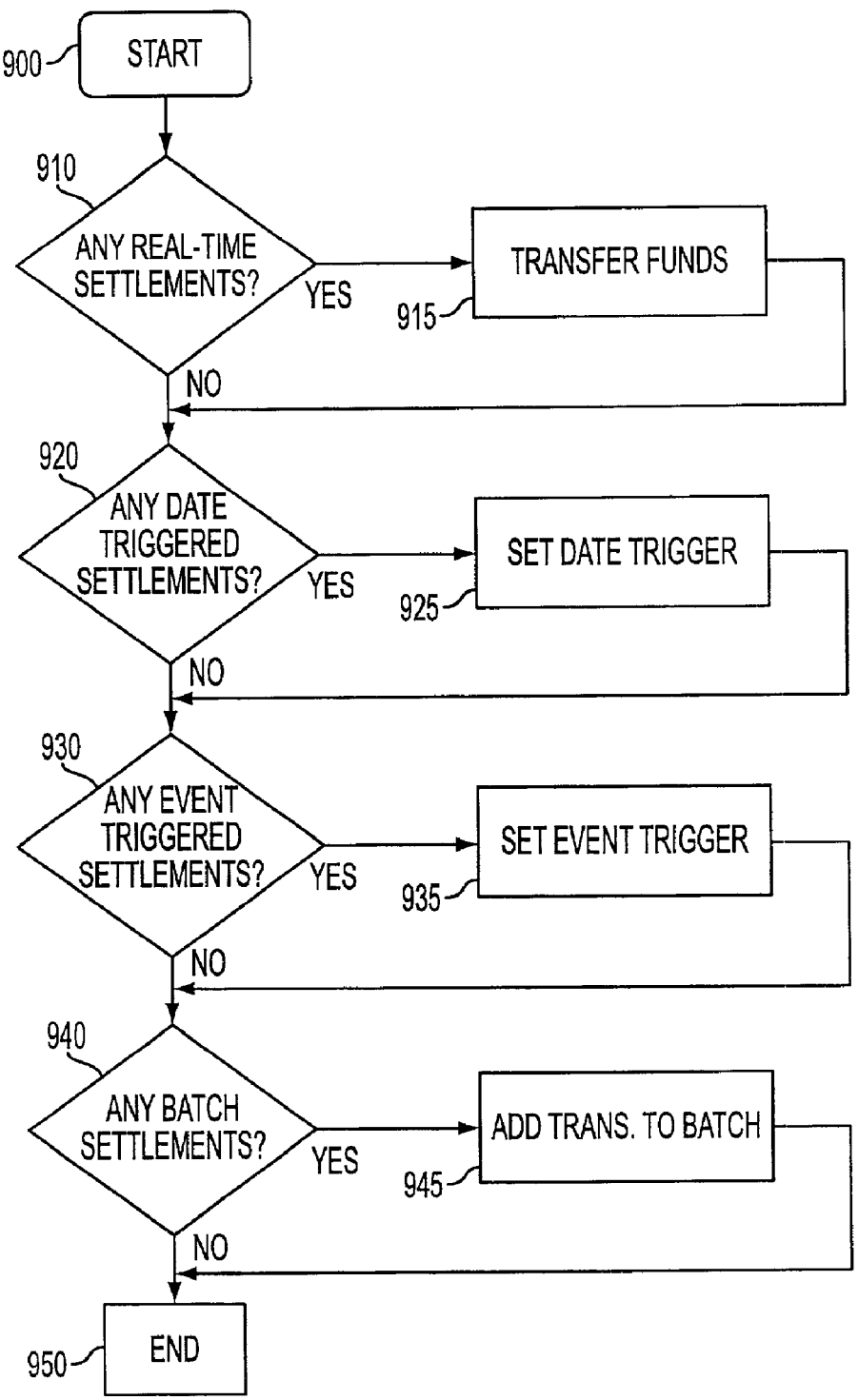
FIG. 9 is an exemplary method of sophisticated settlement procedures utilizing a convergent communications system.

FIG. 9 shows an exemplary transaction settlement method for a convergent communications system and method according to several exemplary embodiments of the invention. The method shown in FIG. 9 is a linear progression of questions. However, other various exemplary embodiments may include simultaneous questions, contingent questions and questions with undefined answers. The method begins at start 900 and continues to determine if there are any real time settlements 910.

If the determination is made in any real time settlements 910 that there are real time settlements, the method continues to transfer funds 915. In transfer funds 915, an instruction is given to immediately transfer funds between accounts. The method then continues back to determining if there are any date-triggered settlements 920. Alternately, if the determination is made in any real time settlements 910 that there are not real time settlements, the method continues to determining if there are any date-triggered settlements 920.

If the determination is made in determining if there are any date-triggered settlements 920 that there are date-triggered settlements, the method continues to set date trigger

925. In set date trigger 925, a trigger is set that will activate a transfer for funds on the determined date. The method then continues back to determining if there are any event-triggered settlements 930. Alternately, if the determination is made in determining if there are any date-triggered settlements 920 that there are no date-triggered settlements, the method continues to determining if there are any event-triggered settlements 930.

If the determination is made in determining if there are any event-triggered settlements 930 that there are event-triggered settlements, the method continues to set event trigger 935. In set event trigger 935, a trigger is set that will activate a transfer for funds on the determined event. The method then continues back to determining if there are any batch settlements 940. Alternately, if the determination is made in determining if there are any date-triggered settlements 930 that there are no date-triggered settlements, the method continues to determining if there are any batch settlements 940.

If the determination is made in determining if there are any batch settlements 940 that there are batch settlements, the method continues to add transaction to batch 945. In add transaction to batch 945, the transaction results are added to the list of transactions to be run the next time the batch is called. The method then continues back to end 950. Alternately, if the determination is made in determining if there are any batch settlements 940 that there are no batch settlements, the method continues to end 950.

For example, if the transaction is a pure communication transaction when there is more than one communication service provider involved (e.g., roaming), as soon as the transaction (e.g., a telephone call) is over, the exemplary settlements module looks at the transaction, identifies the parties (e.g., service providers) involved, and applies the rules for settlement (e.g., real-time or time-delayed settlements, partner settlement tariff plans, discounts for volume ordering, whether any portion is to be paid to regulatory agencies etc). Based on the rules, the convergent communications system and method can also identify whether the settlements have to be done within the exemplary system itself or whether they have to be conducted using external agencies. The convergent communications system and method would then apply the rules and work out the settlement netting information & reports. For external agencies, such information is passed on in a pre-agreed format (e.g., TAP records, pre-agreed ASCII text files, MXP records, CIBER records, or IPDR records, etc.).

In another example, the transaction can be a commerce transaction. The exemplary convergent communications system and method would follow the same process as above, but the rules applied could be a bit more complicated as the rules need to take care of all or some of external service providers (e.g., a merchant may use a courier to deliver the goods and some of the rules related to physical delivery may be non-real time and sometimes even some processes may not be automatic). Settlement rules could also be more complex (e.g., the settlement value could depend on volume, weight, etc.).

If the transaction is a convergent transaction (commerce and communication), the exemplary convergent communications system and method would be a combination of both the types mentioned above. The exemplary convergent communications system and method could also add further complexity to the rules in the sense that based on the commerce settlement rules, some of the rules for communication settlements might get impacted. For example, if a customer purchases goods worth $50 at the visiting network, the visiting network might not charge any roaming airtime charges to the home network. The home network might or might not pass on this benefit to the end-customer.

The above method follows from the following practical examples. A customer Jim is roaming on his CDMA prepaid mobile phone in Washington D.C. while on vacation. His home network is North Carolina Mobile where he pays a monthly service fee of $50 for an all you can use weekend minutes plan anywhere on the home network. Roaming is charged at an additional rate of $1 per call by his home network.

In Washington D.C., Jim is listening to Santana's Greatest Hits via the Orange MusicStreamer music service he receives over the GSM network. He receives an simple messaging system (SMS) ad promoting Sonny's new mini-digital CD player. He reads the ad while listening to Carlos Santana. Following the short list of the CD player's features is an offer to buy the CD player for 33% off list price if purchased within the next 15 minutes. He impulsively decides to click on the offer and is taken to the Orange MusicStreamer mobile services shopping website.

The Orange MusicStreamer website was developed by Aether Systems. And through a contract with Orange, Aether manages the site. For this management, development and design relationship, Aether receives remuneration in a number of ways. These include: (1) a straight fixed price for development of the website; (2) a monthly management fee for keeping the site up, providing service, etc.; (3) a flat rate of 2 cents for every click-thru received on any advertising on the site; (4) a percentage of a product's or service's price for every item purchased as a result of the site's advertising; and (5) a flat rate of $1 for every customer service call provided on behalf of Orange MusicStreamer.

Jim continues to listen to Carlos Santana while he clicks through a couple more screens about the Sonny CD Player on the mobile website. He clicks to see pricing and availability. The site provides him with two Orange MusicStreamer partners where he can purchase the product. He chooses Amazoom over Electronics-R-Us and immediately brings up the Amazoom mobile shopping site.

On Amazoom, Jim chooses the easy payment plan that offers the CD player for $100 (list price was $150), and he elects to pay that in two payments ($50 now and $50 when the CD player is delivered). He clicks on the Prepaid button and chooses to use his convergent communications system prepaid account.

Amazoom packages Jim's new CD player in a FedExtra box and arranges for InsurUs to provide insurance on the package. FedExtra shipping costs Amazoom $5.00 and InsurUs insures the CD player for a total cost of $0.50.

Jim continues to listen to Carlos Santana on his prepaid phone while he anxiously waits for his return train to North Carolina. When he arrives home, FedExtra delivers his CD player and his signature on the bill of lading triggers a value chain of transactions across a number of service providers.

The following settlement transactions take place using embodiments of the system and method of the invention:

| Partner | Trans Type | Payee | Timing | Amount |
|---|---|---|---|---|
| Telco (home network service provider): North Carolina MobileTel | All-you-can-use monthly service | From Jim via bank account | Monthly in advance | $50 per month |
| Telco (home network service provider): North Carolina MobileTel | Roaming | From Jim | Real-time | $1 per call |
| Telco (visitor network service provider): Orange MusicStreamer | Minutes for roaming on network | From home network | Real-time | $.02 per minute |
| Telco (visitor network service provider): Orange MusicStreamer | Music Service Charge | From home network | Real-time | $.03 per minute |
| Merchant: Amazoom | Fixed amount | From Jim | $50 now, $50 after delivery | $100 |
| Shipper/courier company: Fed Extra | Fixed amount | From Jim | $5 upon shipping | $5 |
| Insurance company: InsurUs | Percent | From Jim | Upon shipping | $0.50 (.25% of purchase price) |
| Telco Partner 1 (developer and manager of mobile web site): Aether Systems | Flat rate for ad click-thru | From Orange Voice Stream | Real-time | $.02 per click thru on an ad |
| Telco Partner 1 (developer and manager of mobile web site): Aether Systems | Percent of product sales price | From Orange | Batch process, monthly payment | .25 % of purchase price |
| Telco Partner 2 (music service - Virgin) | Percent | From Orange | Batch process monthly payment | $.005 per minute |
| Telco Partner 2 service provider (musician's commission clearing center) | Percent | From Orange thru music service | Batch processing monthly payment | $.001 per minute |
| Advertiser on Telco Partner web site: Sonny | Flat rate based on click thru | From Sony to Telco partner | Monthly payment, batch processing | $.05 per click thru |

The settlement portion of the exemplary convergent communications system and method controls how a payment is routed and which account is to be credited by the payment. These transaction settlement rules would comprise settling between accounts, from different accounts, etc., to many accounts. The exemplary system thus: allows for multiparty settlements of converged services and communication transactions, allows for configuring the settlement rules for each service and commerce transaction and allows for settlements between: merchants (provider of goods/services, e.g., either manufacturer, reseller or distributor or a combination of several such entities), portals (mobile portal or any other type of portal including electronic-commerce portals, etc.), Internet service providers (independent agencies or mobile operators or portals), mobile phone companies (home network, visiting network, or both), virtual service providers (content service providers or infrastructure service providers or branding agencies or any combination), bank/credit card agencies or any other financial institutions (one or more involved in a commerce transaction), third party payment agencies (e.g., merchant aggregators, payment processing agencies or e-wallets or any such payment processing agencies), goods/service delivery agencies (e.g., courier companies, bandwidth suppliers) and insurance agencies.

As embodied herein, the convergent communications system and method can provide configuration of settlement rules for various situations such as: settlement in real time, settlement with a time delay (e.g., after 2 days or 30 days, etc.), settlement based on confirmation of a certain condition (e.g., a courier is paid only when the goods are delivered, whereas an insurance agency is paid before shipment of goods), settlement based on a business relationship between the parties (e.g., a courier agency offers discounts based on volumes—that means the settlement process would take into account several deliveries rather than just one delivery), and settlement based on performance (e.g., a portal is paid a small value each time an advertisement is delivered to the roaming subscriber and the portal gets paid a larger value if the roaming subscriber actually purchases the goods/services). As embodied herein, the convergent communications system and method can provide for settlements that take into account a roaming contract between participating networks (e.g., roaming surcharge). Further the convergent communications system and method can provide for settlements that take into account any regulatory requirements (e.g., appropriation of taxes and settlement with government agencies). Thus, the transaction does not have to be just one transaction payment, or immediate credit, the transaction could be split up into multiple debits adding up to the purchase price. The transaction could also be monthly transactions spread out over the year, (covering "all you can use plans"), etc.

As embodied herein, the convergent communications system and method can provide for settlements that can be divided into the following categories: credit days, credit limits, financial volume thresholds, discounts for volume ordering, regulatory criteria, settlement percentages, service type based, on demand (recurring, closure of relationship based), on-line, online-real-time and batch based on various time criteria.

FIG. 10 shows an exemplary breakout of charges for communication services for a convergent communications system and method according to several exemplary embodiments of the invention. FIG. 10 includes a column for type of charge, charge decided by, amount deducted by, amounts due to the home network and roaming network, and the basis for deciding charges. For example, a commerce transaction may need to pay for mobile originated calls (MOC) in the home network via a service tax rental and recharge fees.

Figure 11:
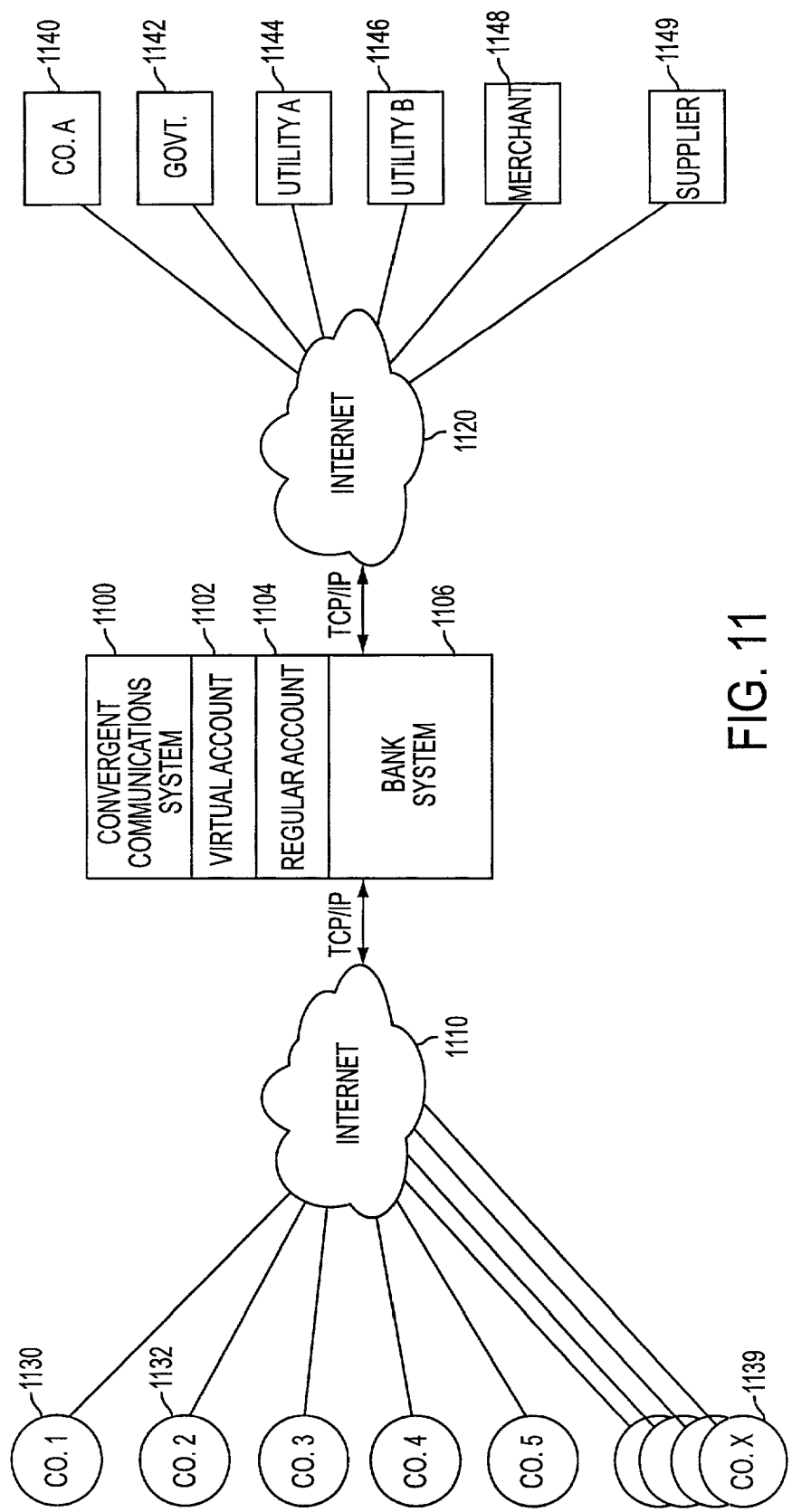
FIG. 11 is an example of business to business transactions utilizing a convergent communications system.

FIG. 11 is a block diagram showing an example of a business to business (B2B) convergent communications system and method according to several exemplary embodiments of the invention. As seen in FIG. 11, company 1 1130, company 2 1132 through company x 1139 connect via Internet 1110 to the convergent communications system 1100. In addition, company A 1140, government 1142, utility A 1144, utility B 1146, merchant 1148 and supplier 1149 connect via internet 1120 to the convergent communications system 1100. Convergent communications system 1100 can be connected or integrated with virtual account 1102, regular account 1104 and bank system 1106. Thus, a company such as company 1 1130 needs only have one connection to the internet 1110 in order to conduct business to business transactions with any of company A 1140 through supplier 1149.

Figure 12:
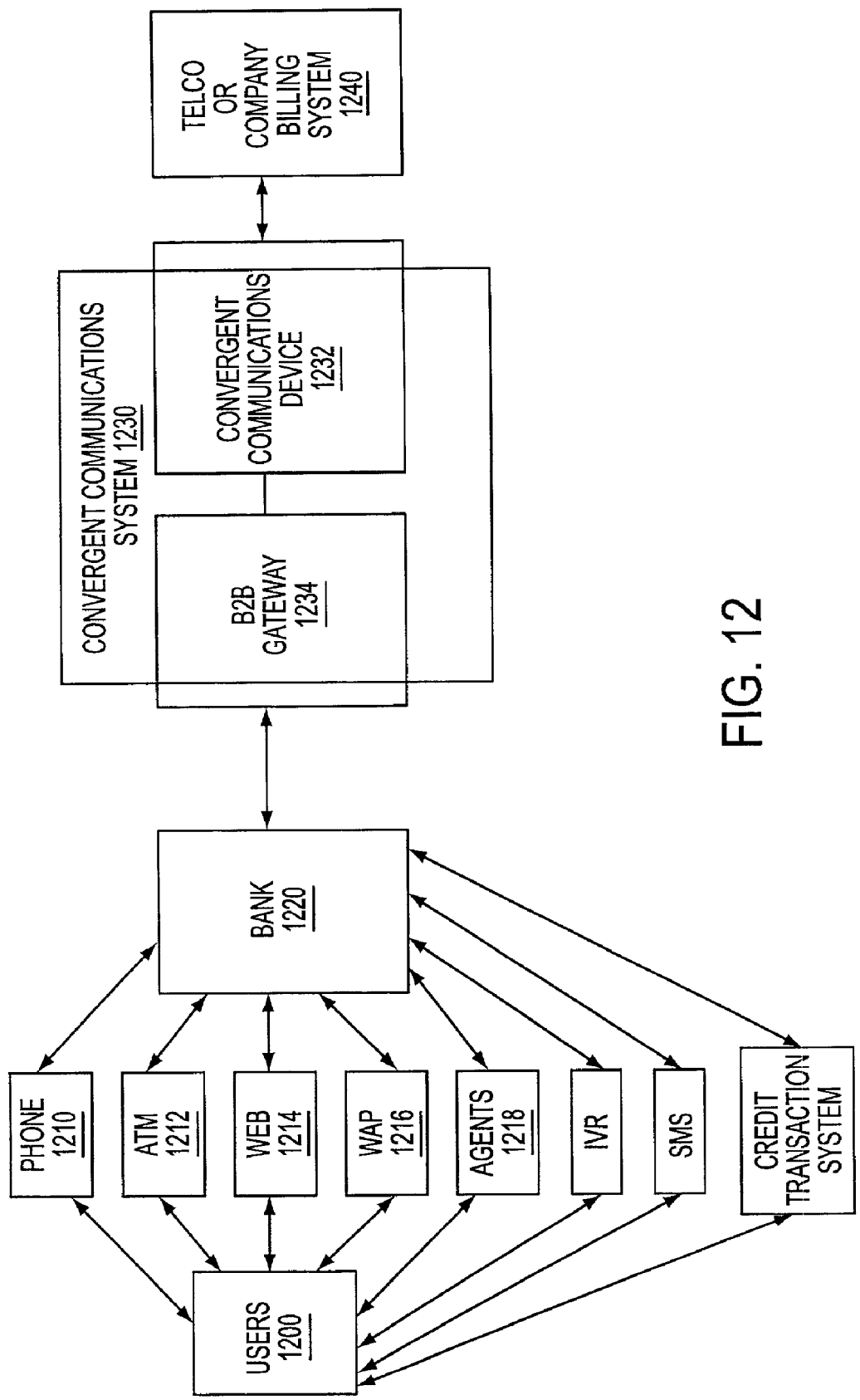
FIG. 12 is a block diagram of utilizing a convergent communications system to conduct business to business commerce.

FIG. 12 is a block diagram showing another example of a business to business convergent communications system and method according to several exemplary embodiments of the invention. In FIG. 12, users 1200 can connect variously via phone 1210, ATM 1212, WEB 1214, WAP 1216 and agents 1218 through bank 1220. Bank 1220 connects to the B2B gateway 1234. The B2B gateway 1234 is part of the convergent communications system 1230, which also contains convergent communications device 1232. Convergent communications device 1232 connects to the telephone company or other company billing system 1240. Thus users 1200 can deposit or transfer funds using a phone 1210, ATM 1212, the WEB 1214 or WAP 1216 or agent 1218 to transfer funds between accounts and/or designate a business to business transaction utilizing the bank 1220 to a telephone company or company billing system 1240. In addition, as shown in FIG. 12, bank 1220 needs only have one connection to the convergent communication system 1230 to conduct business-to-business commerce with many different entities.

Figure 13:
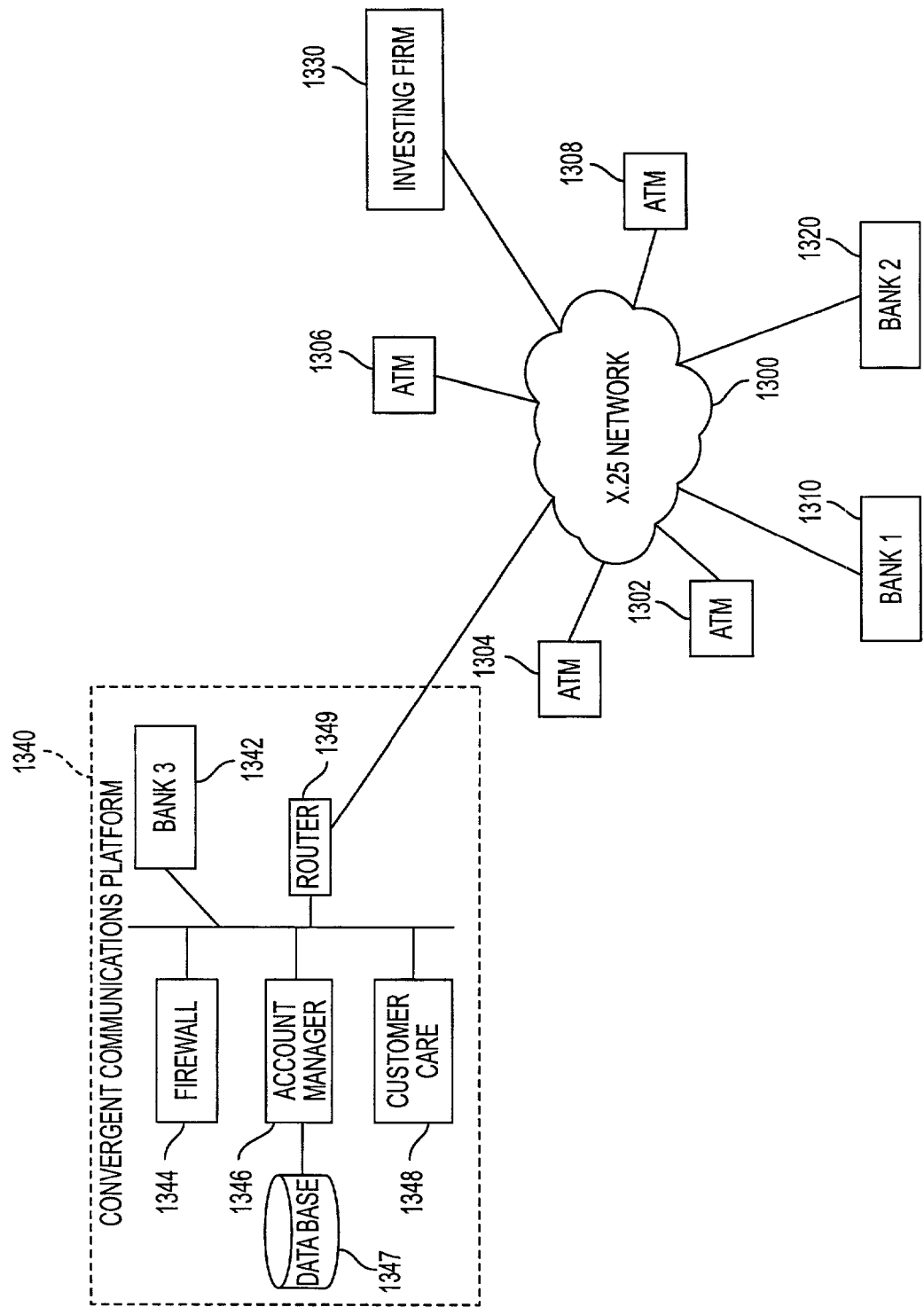
FIG. 13 is a block diagram of an exemplary system for account recharge for a convergent communications system.

FIG. 13 is a block diagram of an exemplary system for recharging a customer pre-paid account for a convergent communications system and method according to several exemplary embodiments of the invention 1340. In FIG. 13, various devices such as ATM 1306, ATM 1304, ATM 1302, ATM 1308, investing firm 1330, bank 2 1320 and bank 1 1310 are connected to X.25 network 1300. The X.25 network 1300 is connected to router 1349 as part of the convergent communications platform 1340. Convergent communications platform 1340 can contain firewall 1344, account manager 1346, customer care 1348 and bank 3 1342. Account manager 1346 can be connected to database 1347. Thus, a customer user can access his account in the convergent communications platform 1340 from any remote means, such as ATM 1306.

Figure 14:
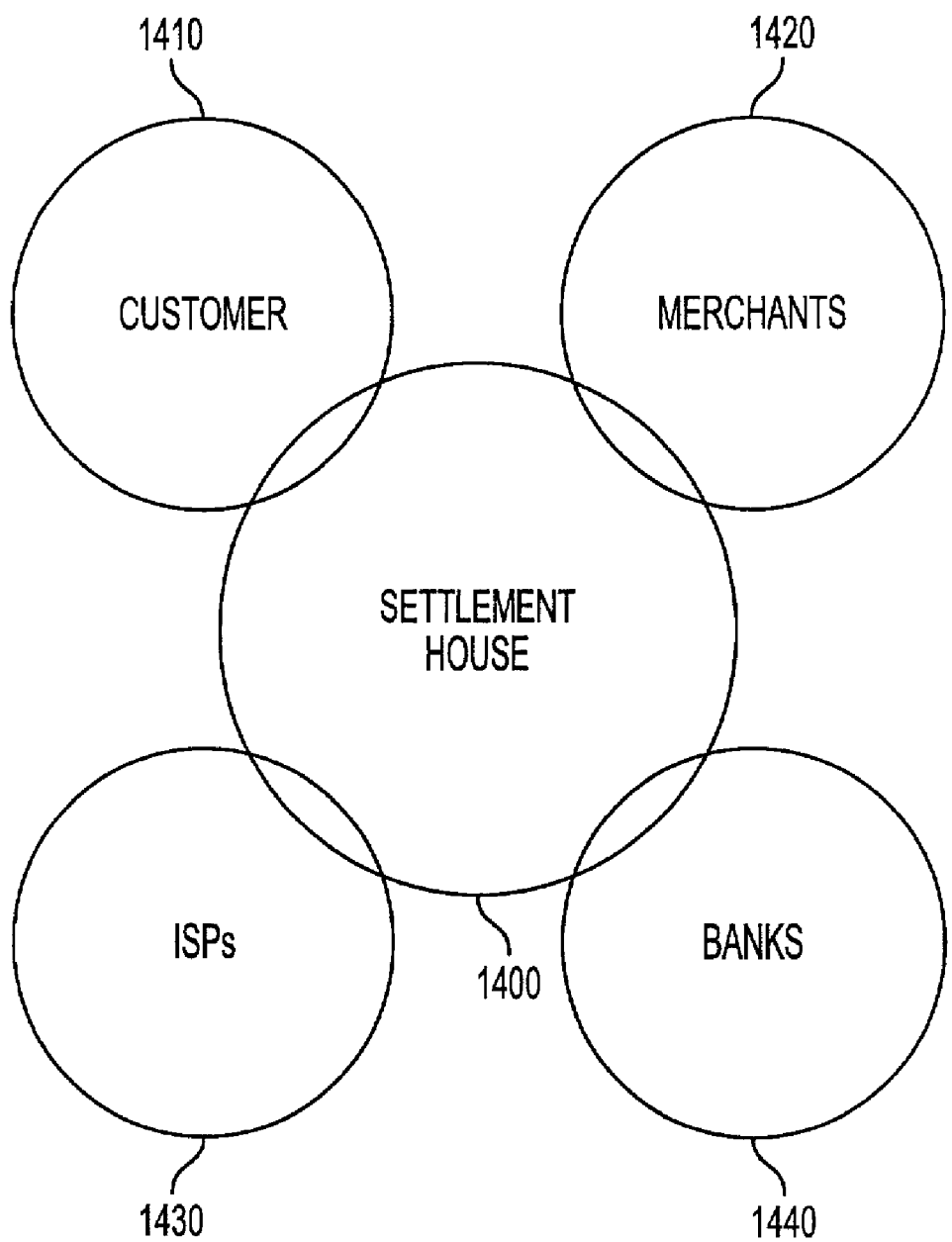
FIG. 14 is an example of multiparty settlement utilizing a convergent communications system as a settlement house.

FIG. 14 shows an exemplary embodiment of multiparty settlement using a convergent communications system and method according to several exemplary embodiments of the invention as a settlement house. As seen in FIG. 14, the settlement house 1400 can be related to banks 1440, merchants 1420, Internet service providers 1430 and customers 1410. The convergent communications platform, can thus act as a single conduit for multiparty financial settlements, in addition to acting as a single conduit for multiple transactions via heterogeneous networks.

FIG. 15 is an exemplary screen shot of vendor, merchant and service provider information for settlement in a convergent communications platform. As seen in FIG. 15, various rules for interaction and settlement arrangements with various vendors, service providers and merchants can be stored. For example, the exemplary convergent communications platform can store and display the merchant, the condition of settlement, the value of settlement, the units for settlement, time stamps, currency, contract versions, valid dates for the contract and any additional rules related to the contract. For example, Satyam online wishes to settle E-commerce transactions after receipt, with a value greater than 5, where it is collecting a percentage of total receipts. In addition, the contract is valid from Nov. 23, 2000 through Nov. 23, 2000.

FIG. 16 is an exemplary screen shot of adding vendor/service provider/merchant information to a convergent communications platform. As shown in FIG. 16, a merchant, for example, Sify@Information.com can have such information as contract, valid from, valid till, condition, payment mode, value, timestamp, merchant, condition, payment mode, value, time stamp and save relating to the merchant.

The data structures underlying FIG. 16, embodied in the convergent communications system and method enable new types of authorization. As service types proliferate and diversify from conventional voice telephony to all kinds of data, content, entertainment, physical purchasing, so the matching of requestor to service type for the authorization becomes increasingly complex. When multiple service providers collaborate to provide a particular service to a customer, there is a strong likelihood that the same pool of service providers in different combinations, or the same combinations being requested for different services, will demand widely differing criteria for both defining the service profile and matching the requester to the profile.

These criteria will include economic ones (of which the presence of a prepaid balance is just the most simple) and these economic criteria are in fact no different in essence from any other criteria. In fact, they may be inextricably bound up with non-economic criteria. For example a rule, which says that a $20 transaction to purchase a train ticket may be authorized so long as there is a current balance of not less than zero (allowing a $20 overdraft in other words) where the requester is aged 60 years or above and the request is made outside banking hours. This is a set of criteria which is defined by economic characteristics, transaction-type characteristics, requester characteristics, and time of day.

These constantly shifting criteria are embedded in a set of rules which will be applied by simple concatenation using linear logical operators or be applied in complex three dimensional rules matrices. These rules matrices can be applied at the time of the transaction request (i.e., in real time). The rules matrix can be applied on a transaction-bytransaction basis. The matrix may look different, even for an identical transaction, when a different set of service providers underlies its delivery.

Furthermore, as embodied herein, the convergent communications system and method can provide for a best business practice that will constantly modify rules, even on a real-time basis, in order to achieve maximum transaction authorization commensurate with minimum risk. Risk may be economic but it may not. The risk could, for example, be one of legal exposure—consider the case of an online casino which may have a legal exposure if it allows anyone under 18 years to play blackjack. Or maybe a casino, which is legally obliged to admit members only—thereby necessitating some form of membership application and processing before permitting entry.

In the mobile-world for example, where by definition every transaction is recorded digitally, the convergent communications system and method can provide for these best business practices by implementing artificial intelligence and adaptive rule-making techniques to optimize the risk/return computation. Thus, the exemplary embodiments shown above can enable adaptive rule making, fuzzy logic and other advanced forms of decision making relative to authorizing a transaction.

FIG. 17 shows an exemplary rules repository for implementing a sophisticated rule set within a convergent communications system. The exemplary rules repository contains several tables. The tables can be named rules master 1700, subscriber 1710, service provider 1720 and service 1730. Each table can contain several fields which hold data related to implementing various rule sets.

The rules master 1700 table, for example, can have rule identifier, time based, day based, date based, volume based, percentage, location based, subscriber attribute based, service provider attribute based, service based, last transaction based and foreclosure contract based fields. The rule identifier field may be linked to the subscriber 1710 table, and the service provider 1720 table.

The subscriber 1710 table can have subscriber identifier, service identifier, service provider identifier, balance credit, usage amount and list of rules fields. The service identifier field may be linked to the service 1730 table. The service provider identifier field may be linked to the service provider 1720 table. The list of rules field may be linked to the rules master 1700 table.

The service provider 1720 table can have service provider identifier, service identifier, visiting service provider, payable, receivable and list of rules fields. The service provider field may be linked to the visiting service provider field and the subscriber 1710 table. The service identifier field may be linked to the service 1730 table. The list of rules field may be linked to the rules master 1700 table.

The service 1730 table can have service identifier, type of service and tariff fields. The service identifier field may be linked to the subscriber 1710 and service provider 1720 fields.

Additional tables may be part of an overall convergent communications system and method. Additionally, while descriptive names are used for the various tables and fields used in the exemplary rules repository, any name, whether related to the function of the field or table or not may be used. Additional fields in each of the table may be used, for example, a tracking field to keep dates of modification may be used.

Figure 18:
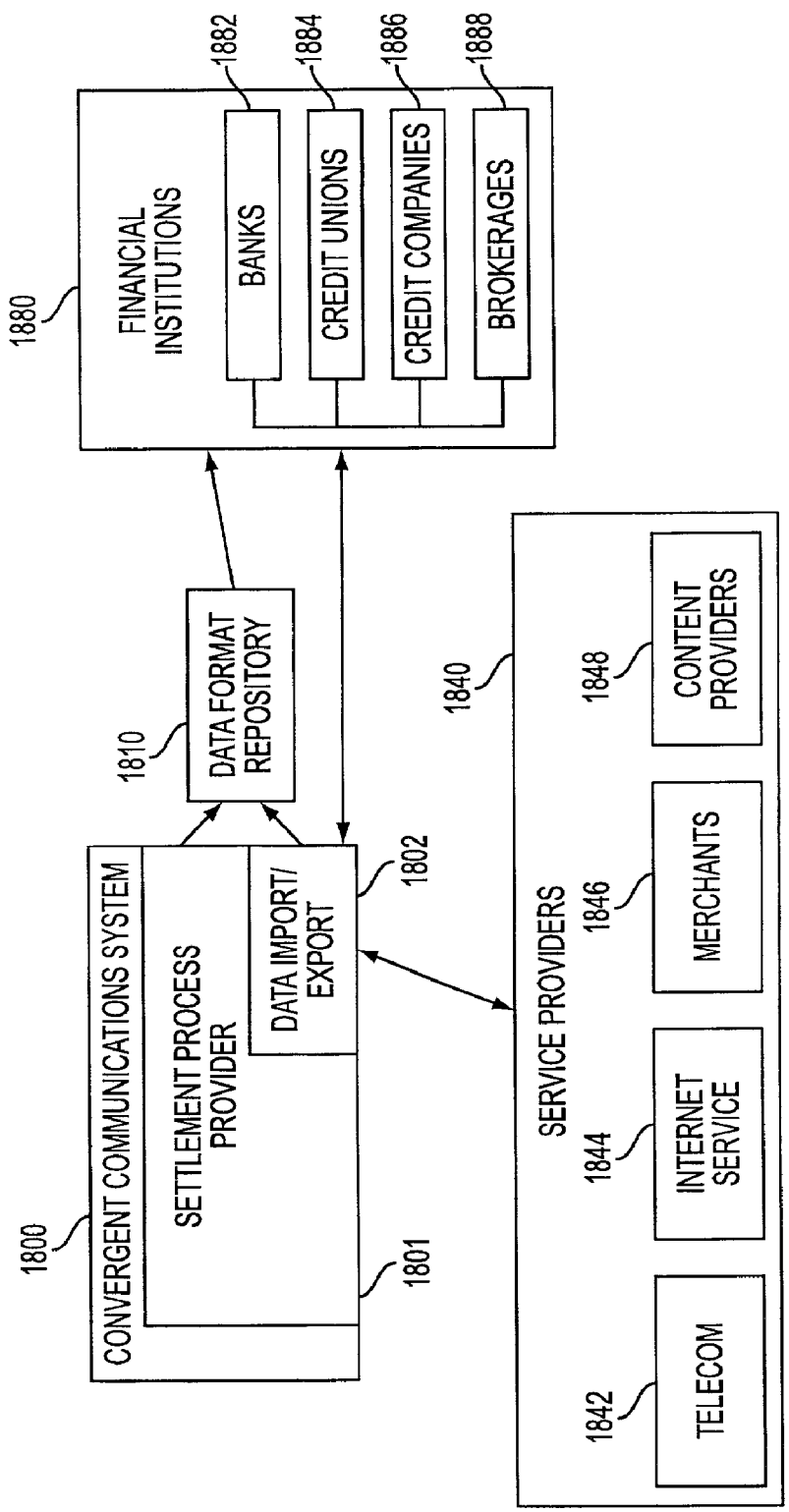
FIG. 18 is an exemplary apparatus that can implement settlement for a convergent communications system.

FIG. 18 is an exemplary apparatus that can implement the settlement process using a convergent communications system and method according to a preferred embodiment of the invention. The overall system includes a convergent communications system 1800, service providers 1840 and financial institutions 1880. After a transaction has been authorized and debited, the exemplary apparatus demonstrates one way that settlement can occur, when service providers 1840 maintain accounts within financial institutions 1880 and do not directly receive funds for service provided. While this scenario is the most common, with funds transferring from one account in one financial institution to another, there are additional scenarios that can impact settlement.

Settlement begins with an account in the convergent communications system 1800 being debited coincident with a service provider 1840 providing a service. The convergent communications system 1800 can contain a settlement service provider 1801. The settlement service provider can contain a data import/export 1802 that transfers information between the convergent communications system 1800, the service providers 1840, the financial institutions 1780 and data format repository 1810.

Thus, for example, a service provider 1840 can provide settlement rules to the settlement process provider 1801 through the data import/export 1802. The settlement rules can then be used to either produce data for the data format repository or to provide transfer instructions to the financial institutions 1880. The financial institutions can then transfer funds between institutions or accounts. For example, if the convergent communications system 1800 has a user account that is hosted by credit union 1884, and a service provider 1840 provides a service that will be credited to their account in bank 1882, the settlement process provider 1801 can simply provide transfer instructions to the financial institutions 1880.

Service providers can be any one of telecom companies 1842, Internet service companies 1844, merchants 1846, content providers 1848 or any other now known or later created devices organization for providing goods or services. Financial institutions 1880 can be any one of banks 1882, credit unions 1884, credit companies 1886, brokerages 1888 or any now known or later created organization for holding and transferring value.

There are several exemplary ways to access the system. For example, one of the preferred embodiments of the invention specifically includes accessing the system through an ATM, a bank, an agent, a POS, an interactive voice response system, a cellular phone, a fixed line telephone, the Internet, a WAP (via cell), a simple messaging system (via fixed line telephone and cell), a Perto machine (i.e. a machine that accepts cash to pay bills) and a post office.

There are several exemplary types of people that will use the system. For example, the system may be used by a consumer, a family member, a child, a business user, a business manager, a business subordinate, a payment company user and a bank user.

There are several exemplary types of accounts that the system can transfer funds between. For example the system may relate to a bank account (different types, checking, savings, growth, education, holiday, etc.), a cash account, a credit card account, a debit card account, a virtual account, an investment account, a brokerage account and a business account. The exemplary system can use multiple formats for the communication about transfers, as noted above and as are generally known in the art.

There are several exemplary recipients of funds. For example, types of payments made in general will fall into three different categories peer-to-peer, business to consumer and business-to-business. More specifically, types of payments may include tolls, utilities, taxes, other municipal uses (licenses, etc.), retail (brick & mortar), retail (electronic commerce/internet), mobile-commerce, cellular, ISPs, banks, insurance companies, charitable organizations, brokerage companies, gifts to family members and fixed line telephone bills.

There are several exemplary ways for the exemplary system to communicate with, or determine how to communicate with, other accounts for the transfer of funds. For example, the payment accounts can be validated through: a national wireless telecom database (cellular); a national fixed line telecom database (telephone); a national bank account database; individual accounts of each payment accepting company—i.e., the retail store Renner has a database of all its customers with Renner credit cards or payment types and a municipality database for tax, licenses, etc.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A convergent communications method employing a rule set, comprising:
   determining, for an authorized user, at least one payment rule applicable at that time for authorizing a transaction and resultant settling of an account of the authorized user in response to an instruction received via at least one communication network;
   applying the at least one payment rule for authorizing the transaction;
   charging the account, according to the at least one payment rule, in real time if the transaction is authorized; and
   settling charges to the account by one of a plurality of transaction providers in accordance with at least one settlement rule, said charging and settling performed utilizing at least one financial network, separate from the at least one communication network.

2. The convergent communications method of claim 1, further comprising:
   determining that the authorized user does not have sufficient value in an authorized user account to charge for the transaction; and
   recharging the authorized user account after completing a recharge routine comprising
      determining a recharge user account to transfer funds from, and
      authorizing the transfer by at least one of referring to a pre-authorized transfer or requesting authorization from the authorized user.

3. The convergent communications method of claim 2, wherein the recharging is performed utilizing at least one of a plurality of recharge user accounts.

4. The convergent communications method of claim 2, wherein the requesting authorization from the authorized user is at least one of requesting a user PIN, requesting manual entry, requesting a user pass phrase or confirming user identity through biometric means.

5. The convergent communications method of claim 1, wherein the charging is performed utilizing a plurality of payment rules for charging an account and the settling is performed utilizing a plurality of settlement rules.

6. The convergent communications method of claim 1, wherein the applying is performed utilizing a plurality of payment rules for authorizing the transaction, the charging is performed utilizing a plurality of payment rules for charging an account and the settling is performed utilizing a plurality of settlement rules.

7. The convergent communications method of claim 1, wherein the settlement occurs at least one of immediately, after 3 days, at the end of a calendar month, at regularly spaced intervals or as a series of partial payments.

8. The convergent communications method of claim 1, wherein the applying the at least one payment rule for authorizing the transaction includes authorizing the transaction using at least one of a PIN, manual entry, a user pass phrase or confirming user identity through biometric means.

9. The convergent communications method of claim 1, further comprising determining the at least one payment rule and resultant application in real time as a result of a transaction authorization request according to an algorithm which uses timing of the transaction authorization request as a function in the algorithm.

10. The convergent communications method of claim 1, further comprising determining the at least one payment rule, in real time as a result of a transaction authorization request according to an algorithm using inputs from sources of data relating to historical events, which are considered to have relevance to the transaction authorization request.

11. The convergent communications method of claim 10, wherein the historical events are an authorized user's previous purchases or actual outcomes of historical risk assessments.

12. The convergent communications method of claim 1, further comprising determining the at least one payment rule, in real time as a result of a transaction authorization request according to an algorithm using historical data relating to historical events, which are considered to have relevance to the transaction authorization request, where the historical data available changes with each billing period.

13. The convergent communications method of claim 12, wherein the historical events are the authorized user's previous purchases or actual outcomes of historical risk assessments.

14. The convergent communications method of claim 1, wherein the transaction is requested and a connection to the plurality of transaction providers is across heterogeneous networks.

15. The convergent communications method of claim 1, wherein the charging includes at least one of checking that a membership is current, reducing or increasing a number of frequent flyer miles, increasing or decreasing a merchandizing credit, or recording an agreement.

16. A user input device for accessing an account in a convergent communications system, comprising:
   a transmitter that transmits to the convergent communications system via at least one communication network, identification of an authorized user account and a request for a transaction by an account manager, the account manager including
      a determiner that determines, for an authorized user, at least one payment rule applicable at that time for authorizing a transaction and charging an account,
      a processor that applies the at least one payment rule for authorizing the transaction, an account charger that charges the account, according to the at least one payment rule, in real time if the transaction is authorized, and
a settler that settles real time charges to a plurality of transaction providers in accordance with at least one settlement rule; and
a receiver that receives, via at least one financial network in addition to the at least one communication network, at least one of a confirmation of authorized user account charge or a notification of settlement.

17. The user input device of claim 16, wherein the account manager further comprises:
a determiner that determines the authorized user does not have sufficient value in an authorized user account to charge for the transaction; and
a recharger that recharges the authorized user account after completing a recharge routine comprising
determining a recharge user account to transfer funds from, and
authorizing the transfer by at least one of referring to a pre-authorized transfer or requesting authorization from the authorized user.

18. The user input device of claim 17, wherein the recharging is performed utilizing at least one of a plurality of recharge user accounts.

19. The user input device of claim 17, wherein the requesting authorization from the authorized user is at least one of requesting a PIN, requesting manual entry, requesting a pass phrase or confirming identity through biometric means.

20. The user input device of claim 16, wherein the account charger utilizes a plurality of payment rules for charging an account and the settler utilizes a plurality of settlement rules.

21. The user input device of claim 16, wherein the processor utilizes a plurality of payment rules for authorizing the transaction, the account charger utilizes a plurality of payment rules for debiting an account and the settler utilizes a plurality of settlement rules.

22. The user input device of claim 16, wherein the settlement occurs at least one of immediately, after 3 days, at the end of a calendar month, at regularly spaced intervals or as a series of partial payments.

23. The user input device of claim 16, wherein the applying the at least one payment rule for authorizing the transaction includes authorizing the transaction using at least one of a PIN, manual entry, a user pass phrase or confirming user identity through biometric means.

24. The user input device of claim 16, further comprising determining the at least one payment rule in real time as a result of a transaction authorization request according to an algorithm which uses timing of the transaction authorization request as a function in the algorithm.

25. The user input device of claim 16, further comprising determining the at least one payment rule, in real time as a result of a transaction authorization request according to an algorithm using data relating to historical events, which are considered to have relevance to the transaction authorization request.

26. The user input device of claim 25, wherein the historical events are the authorized user's previous purchases or actual outcomes of historical risk assessments.

27. The user input device of claim 16, further comprising determining at least one payment rule, in real time as a result of a transaction authorization request according to an algorithm using historical data relating to historical events, which are considered to have relevance to the transaction authorization request, where the historical data available changes with each billing period.

28. The user input device of claim 27, wherein the historical events are an authorized user's previous purchases or actual outcomes of historical risk assessments.

29. The user input device of claim 27, wherein the user input device is at least one of a computer, a telephone, a cellular telephone, a computer, a point of service device or an MP3 player.

30. The user input device of claim 16, wherein the transaction is requested and a connection to the plurality of transaction providers is across heterogeneous networks.

31. The user input device of claim 16, wherein the account charger charges by at least one of checking that a membership is current, reducing or increasing a number of frequent flyer miles, increasing or decreasing a merchandizing credit, or recording an agreement.

32. A convergent communications system employing a rule set and coupled to at least one communication network and at least one financial network separate from the at least one communication network, comprising:
a rule determiner that determines, for an authorized user, at least one payment rule, applicable at that time for authorizing a transaction and charging an account of the authorized user;
a processor that applies the at least one payment rule for authorizing the transaction;
an account charger that charges the account, according to the at least one payment rule for charging the account, in real time if the transaction is authorized; and
a settler that settles charges in real time to at least one of a plurality of transaction providers in accordance with at least one settlement rule.

33. The convergent communications system of claim 32, further comprising:
a worth determiner that determines whether the account of the authorized user has sufficient value to compensate for the transaction; and
a recharger that recharges the account of the authorized user after completing a recharge routine comprising
determining a recharge user account to transfer funds from, and
authorizing the transfer by at least one of referring to a pre-authorized transfer or requesting authorization from the authorized user.

34. The convergent communications system of claim 33, wherein the recharging is performed utilizing at least one of a plurality of recharge user accounts.

35. The convergent communications system of claim 32, wherein the requesting authorization from the authorized user is at least one of requesting a PIN, requesting manual entry, requesting a pass phrase or confirming identity through biometric means.

36. The convergent communications system of claim 32, wherein the account charger utilizes a plurality of payment rules for charging the account and the settler utilizes a plurality of settlement rules.

37. The convergent communications system of claim 32, wherein the applying is performed utilizing a plurality of payment rules for authorizing the transaction, account charger utilizes a plurality of payment rules for charging the account and the settler utilizes a plurality of settlement rules.

38. The convergent communications system of claim 32, wherein the settlement occurs at least one of immediately, after 3 days, at the end of a calendar month, at regularly spaced intervals or as a series of partial payments.

39. The convergent communications system of claim 32, wherein the applying the at least one payment rule includes authorizing the transaction using at least one of a PIN, manual entry, a user pass phrase or confirming user identity through biometric means.

40. The convergent communications system of claim 32, further comprising determining the at least one payment rule in real time as a result of a transaction authorization request according to an algorithm which uses timing of the transaction authorization request as a function in the algorithm.

41. The convergent communications system of claim 32, further comprising determining the at least one payment rule, in real time as a result of a transaction authorization request according to an algorithm using data relating to historical events, which are considered to have relevance to the transaction authorization request.

42. The convergent communications system of claim 41, wherein the historical events are an authorized user's previous purchases or actual outcomes of historical risk assessments.

43. The convergent communications system of claim 32, further comprising determining the at least one payment rule, in real time as a result of a transaction authorization request according to an algorithm using historical data relating to historical events, which are considered to have relevance to the transaction authorization request, where the historical data available changes at least monthly.

44. The convergent communications system of claim 43, wherein the historical events are the authorized user's previous purchases or actual outcomes of historical risk assessments.

45. The convergent communications system of claim 32, wherein the transaction is requested and a connection to the plurality of transaction providers is across heterogeneous networks.

46. The convergent communications system of claim 32, wherein the account charger charges by at least one of checking that a membership is current, reducing or increasing a number of frequent flyer miles, increasing or decreasing a merchandizing credit or recording an agreement.

47. A convergent communications system employing a rule set and coupled to at least one communication network and at least one financial network separate from the at least one communication network, comprising:
  a determiner that determines in real time a plurality of rules for authorizing, charging and settling a transaction at a current time;
  an authorizer that authorizes the transaction if a current status of an authorized user's account or the authorized user meets at least a first rule among the plurality of rules for authorizing the transaction at the current time;
  an account charger that charges the authorized user's account in real time and credits at least one transaction provider account; and
  a settler that settles the transaction according to at least a second rule among the plurality of rules for settling the transaction.

48. The convergent communications system of claim 47, further comprising:
  a second determiner that determines the authorized user does not have sufficient value in an authorized user account to charge for the transaction; and
  a recharger that recharges the authorized user account after completing a recharge routine comprising determining a recharge user account to transfer funds from, and authorizing the transfer by at least one of referring to a pre-authorized transfer or requesting authorization from the authorized user.

49. The convergent communications system of claim 48, wherein the recharging is performed utilizing at least one of a plurality of recharge user accounts.

50. The convergent communications system of claim 48, wherein the requesting authorization from the authorized user is at least one of requesting a PIN, requesting manual entry, requesting a pass phrase or confirming identity through biometric means.

51. The convergent communications system of claim 47, wherein the account charger utilizes a plurality of payment rules for charging an account and the settler utilizes a plurality of settlement rules.

52. The convergent communications system of claim 47, wherein the authorizer utilizes a plurality of payment rules for authorizing the transaction, the account charger utilizes a plurality of payment rules for charging an account and the settler utilizes a plurality of settlement rules.

53. The convergent communications system of claim 47, wherein the settlement occurs at least one of immediately, after 3 days, at the end of a calendar month, at regularly spaced intervals or as a series of partial payments.

54. The convergent communications system of claim 47, wherein the applying of the at least first rule for authorizing the transaction includes authorizing the transaction using at least one of a PIN, manual entry, a user pass phrase or confirming user identity through biometric means.

55. The convergent communications system of claim 47, wherein the determiner determines the at least first rule in real time as a result of a transaction authorization request according to an algorithm which uses timing of the transaction authorization request as a function in the algorithm.

56. The convergent communications system of claim 47, wherein the determiner determines the at least first rule, in real time as a result of a transaction authorization request according to an algorithm using data relating to historical events, which are considered to have relevance to the transaction authorization request.

57. The convergent communications system of claim 56, wherein the historical events are the authorized user's previous purchases or actual outcomes of historical risk assessments.

58. The convergent communications system of claim 47, wherein the determiner determines the at least first rule, in real time as a result of a transaction authorization request according to an algorithm using historical data relating to historical events, which are considered to have relevance to the transaction authorization request, where the historical data available changes at least monthly.

59. The convergent communications system of claim 58, wherein the historical events are the authorized user's previous purchases or actual outcomes of historical risk assessments.

60. The convergent communications system of claim 47, wherein the transaction is requested and a connection to the plurality of transaction providers is across heterogeneous networks.

61. The convergent communications system of claim 47, wherein the account charger charges by at least one of checking that a membership is current, reducing or increasing a number of frequent flyer miles, increasing or decreasing a merchandizing credit or recording an agreement.

62. A convergent communications method employing a rule set, comprising:
   receiving a request for at least one transaction via at least one communication network;
   determining at least one transaction rule currently applicable to an authorized user as a result of the request;
   applying the at least one transaction rule to determine whether the at least one transaction is authorized to be provided by one of a plurality of transaction providers;
   generating in real time, according to the at least one transaction rule if the transaction is authorized, a charge to an account of the user utilizing at least one financial network, separate from the at least one communication network; and
   settling, in accordance with at least one settlement rule, the charge by the one of a plurality of transaction providers utilizing the at least one financial network.

63. The convergent communications method of claim 62, wherein said receiving occurs during setup of the at least one transaction rule, and
   wherein said applying occurs automatically due to the existence of the at least one transaction rule, not in response to said receiving.

64. The convergent communications method of claim 62, wherein said applying, generating and settling are performed in real time in response to said receiving of the request.

* * * * *